(12) United States Patent
Fujii et al.

(10) Patent No.: US 6,961,023 B2
(45) Date of Patent: Nov. 1, 2005

(54) WAVE-TRANSMITTING COVER, AND METHOD FOR PRODUCING IT

(75) Inventors: Tetsuya Fujii, Aichi (JP); Ryoiti Takada, Aichi (JP); Daiichiro Kawashima, Aichi (JP); Hiromi Hyuga, Aichi (JP); Koichi Ogiso, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 175 days.

(21) Appl. No.: 10/645,878

(22) Filed: Aug. 22, 2003

(65) Prior Publication Data

US 2004/0125023 A1 Jul. 1, 2004

(30) Foreign Application Priority Data

Dec. 26, 2002 (JP) .................................... P2002-376469
Mar. 28, 2003 (JP) .................................... P2003-092437

(51) Int. Cl.$^7$ ................................................ H01Q 1/32
(52) U.S. Cl. ................................. 343/713; 343/700 MS
(58) Field of Search .......................... 343/700 MS, 711, 343/713

(56) References Cited

U.S. PATENT DOCUMENTS 6,496,138 B1 * 12/2002 Honma ........................ 342/70
6,686,867 B1 * 2/2004 Lissel et al. .................. 342/70
2003/0180564 A1 * 9/2003 Marquardt ................... 428/523

FOREIGN PATENT DOCUMENTS

| JP | A-H09-239775 | 9/1997 |
| JP | A-2000-159039 | 6/2000 |
| JP | A-2000-344032 | 12/2000 |

* cited by examiner

Primary Examiner—Shih-Chao Chen
(74) Attorney, Agent, or Firm—Posz Law Group, PLC

(57) ABSTRACT

The wave-transmitting cover comprises a transparent resin layer, a base layer and a decorative layer, and the decorative layer contains a lustered piece. The method for producing it comprises a film-forming step of forming a film that has a print face and a deposition design face formed thereon, a shaping step of shaping the film, a first molding step of molding one of a transparent resin layer or a base layer thereon to give a first molded part, and a second molding step of forming the other of the transparent resin layer or the base layer on a surface of the first molded part where the film is provided.

27 Claims, 12 Drawing Sheets

WAVE-TRANSMITTING COVER, AND METHOD FOR PRODUCING IT

The present application is based on Japanese patent Applications Nos. 2002-50363, 2002-376469 and 2003-92437, the entire contents of which are incorporated herein by reference.

BACKGROUND OF THE INVENTION

1. Field of the Invention

The present invention relates to a wave-transmitting cover that covers the opening in the exterior member such as front grille of a vehicle with a wave radar such as a millimetric wave radar or a microwave radar mounted thereon in such a manner that the wave radar is on the back side of the cover, and to a method for producing the cover.

2. Related Art

An autocruise system is for a technique of controlling the distance between a driver's car and the one in front, for which a sensor mounted in the front part of the driver's car acts to measure the distance between the driver's car and the one in front and to measure the relative velocity between the two cars, and, on the basis of this information, the throttle or the brake of the driver's car is controlled so as to accelerate or reduce the speed of the driver's car. Recently, the autocruise system has become noticed as one core technique of intelligent transport systems (ITS) that are for reducing traffic jams and accidents.

For the sensor in the autocruise system, generally used are laser radars and wave radars. Of those, wave radars send microwaves having a frequency of from 300 MHz to 300 GHz and a wavelength of from 1 mm to 1 m to an object, and receive those having hit the object and having been reflected by it, thereby determining the distance between a driver's car and the one in front and the relative velocity between the two cars from the difference between the microwaves they have sent and those they have received. Of such microwaves, millimetric waves have an especially short wavelength, concretely having a frequency of from 30 GHz to 300 GHz and a wavelength of from 1 to 10 mm, and wave radars that utilize such millimetric waves may be down-sized. Down-sized wave radars have heretofore been well used for on-vehicle radars. In addition, since radio waves have a large reflection coefficient to good conductors such as metal, they are effective for discriminating vehicles from each other. Further, as compared with lasers, they are hardly influenced by fog, snow, sunlight, etc. Therefore, wave radars are favorable for on-vehicle radars.

In general, a wave radar is disposed on the back side of the exterior member of a vehicle such as a front grille. Of the exterior member thereof, however, the front grille or the like is plated with metal in many cases, and the metal-plated part could not well transmit radio waves that have a large reflection coefficient to metal. In addition, the front grille is specifically so constructed as to have air intake through-holes, therefore not having a uniform thickness. Accordingly, when radio waves are let in and out via it, then there occurs a difference in the wave transmission rate between the thick part and the thin part of the front grille and the wave radar, if put behind the front grille, could not exhibit a good sensitivity.

Given that situation, in general, a wave-transmitting opening is formed in a site of the exterior member of a vehicle that corresponds to the site where a wave radar is to be disposed. When such an opening is formed in the exterior member of a vehicle, then waves may be let in and out via it. However, the opening may detract from the outward appearance of the integrally-constructed exterior member, and, in addition, the inside structure of a vehicle that houses, for example, its wave radar and engine room therein may be seen through the opening, and it may further detract from the outward appearance of the vehicle. In the related art, therefore, a wave-transmitting cover part is inserted into the opening of the exterior member to thereby ensure the integrated appearance of the opening and the exterior member body (for example, see Japanese Patent Publications Nos. 2000-159039 and 2000-344032). Of the exterior member of a vehicle, a front grille is generally plated with metal, as so mentioned hereinabove. Therefore, the decorative face of the wave-transmitting cover must be processed in any manner to have a metallic gloss. In general, the metallic gloss is formed through indium vapor deposition. Indium may be deposited to form fine islands, and waves may pass through the space among the islands. Therefore, the indium vapor deposition enables both the metallic gloss and the wave transmission.

The radar wave-transmitting cover as disclosed in JP 2000-159039A or JP 2000-344032A is formed of a laminate of resin layers each formed to have a prismatic structure. In this, a metal-deposited layer is formed between the resin layers and it gives a decorative face of the cover. Thus designed, the cover may have an impression as if the fins formed in the front grille be still continued even in the cover part.

However, the radar wave-transmitting cover of the type has such a laminate structure of multiple resin layers and a metal layer formed through vapor deposition between the resin layers, and is therefore problematic in that it requires many steps and molds for molding it. In addition, it further requires a high-precision molding technique in order to flatten the radar wave-transmitting cover as a whole and to make it have a uniform thickness. Moreover, when the decorative face is formed on the prismatically-structured resin layer, it requires a process of vapor deposition and painting. For example, when the decorative face is formed through painting and vapor deposition, then the process for it comprises many steps of, for example, a masking step of masking the area except that to be painted, a panting step of painting the intended area, a drying step of drying the paint, a peeling step of removing the mask, another masking step of masking the area except that to be exposed to vapor deposition and a peeling step of removing the mask that are combined in that order. When the intended design for the decorative face is complicated more, then the number of the steps to constitute the process increases more, and it causes the increase in the production costs.

To reduce the thickness fluctuation that may be caused by precision molding errors, a metal layer may be formed separately and it may be laminated between resin layers in a mode of in-mold molding, and the resin layers may be formed in a mode of two-part molding (for example, see Japanese Patent Publication No. JP H09-239775).

According to the production method for transparent resin products disclosed in JP H09-239775A, the resin layers may be formed in a mode of two-part molding, and molded articles having a predetermined thickness may be obtained not requiring any high-precision molding technique. However, even the production method of JP H09-239775A still requires painting and vapor deposition for forming the decorative face, like in the above, and it is still problematic in that the production costs increase owing to the increase in the number of the process steps.

SUMMARY OF THE INVENTION

The present invention has been made in consideration of the above-mentioned situation, and its object is to provide a wave-transmitting cover and a method for producing it not requiring any high-precision molding technique and capable of reducing the production costs, more specifically the cover and the producing method therefor where a small number of operations and a small number of molds are required for molding the cover.

(1) The wave-transmitting cover of the invention that solves the above-mentioned problems is a wave-transmitting cover that is fitted to the opening of an exterior member of a vehicle along with a wave radar to be disposed on its back, and this comprises a transparent resin layer having a display face to be the outer surface of the cover, a base layer spaced from the transparent resin layer, and a decorative layer laminated in the space between the transparent resin layer and the base layer to display a design thereof on the outer surface of the cover via the transparent resin layer. In this, the decorative layer contains a lustered piece having a deposition design face formed through vapor deposition of a metal material of which the crystals grow in the deposition direction to give a predetermined design.

In the wave-transmitting cover of the invention, the metal material of which the crystals grow in the deposition direction may be selected from indium, tin and gold.

In the wave-transmitting cover of the invention, the decorative layer is covered with a first cover film layer and a second cover film layer, and at least the first or second cover film that faces the transparent resin layer maybe formed of a transparent resin.

The wave-transmitting cover according to the invention is configured to transmit electromagnetic waves such as millimetric waves, sub-millimetric waves, and microwaves etc.

(2) The invention is directed to a method for producing a wave-transmitting cover mounted in the opening of an exterior member of a vehicle along with a wave radar to be disposed on its back, and this comprises a film-forming step of forming a film that has a print face of a predetermined design and has a deposition design face formed through vapor deposition of a metal material of which the crystals grow in the deposition direction, a shaping step of shaping the film into a predetermined shape, a first molding step that comprises disposing the shaped film in a mold and molding one of a transparent resin layer or a base layer thereon to thereby form a first molded part, and a second molding step of forming the other of the transparent resin layer or the base layer on the film-existing face of the first molded part.

Further, the invention is directed to a method for producing a wave-transmitting cover mounted in the opening of an exterior member of a vehicle along with a wave radar to be disposed on its back, and this comprises a film-forming step of forming a film that has a print face of a predetermined design and has a deposition design face formed through vapor deposition of a metal material of which the crystals grow in the deposition direction, a shaping step of shaping the film into a predetermined shape, a first molding step that comprises disposing the shaped film in a mold, forming a transparent resin layer or a base layer on the printed surface of the film and removing the film to thereby form a first molded part that has the print face and the deposition design face transferred thereon from the film, and a second molding step of forming the other of the transparent resin layer or the base layer on the transfer face of the first molded part.

The invention is a method for producing a wave-transmitting cover mounted in the opening of an exterior member of a vehicle along with a wave radar to be disposed on its back, and this comprises a film-forming step that comprises forming a film having a print face of a predetermined design and forming a lustered piece having a deposition design face formed through vapor deposition of a metal material of which the crystals grow in the deposition direction, a shaping step of shaping the film into a predetermined shape, a first molding step that comprises disposing the shaped film with the lustered piece thereon in a mold and molding one of a transparent resin layer or a base layer on it to thereby form a first molded part, and a second molding step of forming the other of the transparent resin layer or the base layer on the film-existing face of the first molded part.

The invention is directed to a method for producing a wave-transmitting cover mounted in the opening of an exterior member of a vehicle along with a wave radar to be disposed on its back, and this comprises a film-forming step of forming a film that has a deposition design face formed through vapor deposition of a metal material of which the crystals grow in the deposition direction, a shaping and molding step that comprises molding a transparent resin layer or a base layer in a mold, forming a design face of a predetermined design on its surface, applying the film to the transparent resin layer or the base layer in the mold with its deposition design face being in contact with the layer, shaping it in that condition into a predetermined shape and removing the film to thereby form a first molded part that has the deposition design face transferred thereon from the film, and a second molding step of forming the other of the transparent resin layer or the base layer on the transfer face of the first molded part.

In the method for producing a wave-transmitting cover of the invention, both surfaces of the film and the lustered piece may be covered with a first cover film layer and a second over film layer in the film-forming step, and at least any one of the first cover film layer and the second cover film layer that is on the side of the transparent resin layer may be formed of a transparent resin.

In the shaping step or in the shaping and molding step in the method, the film may be shaped in a mode of vacuum forming or pressure forming.

One split mold used in the first molding step or in the shaping and molding step in the method may be used also in the second molding step therein, and the transparent resin layer and the base layer may be formed in a mode of two-part molding.

The metal material of which the crystals grow in the deposition direction in the method maybe selected from indium, tin and gold.

The wave-transmitting cover of the invention is a wave-transmitting cover mounted in the opening of an exterior member of a vehicle, and a wave radar such as a millimetric wave radar or a microwave radar is disposed on its back. The wave-transmitting cover of the invention may be fitted to, for example, a front grille, a bumper, a back garnish, a spoiler, a side mall or the like. It may be fitted to the opening of an exterior member of a vehicle through adhesion or welding. If desired, a fastener of a predetermined shape may be formed at the edge of the wave-transmitting cover, via which the cover may be fitted to the opening of an exterior member of a vehicle. Not limited to these, the cover may be fitted to the opening in any known various methods.

The wave-transmitting cover of the invention comprises a transparent resin layer having a display face to be the outer surface of the cover, a base layer spaced from the transparent resin layer, and a decorative layer laminated in the space between the transparent resin layer and the base layer to display a design thereof on the outer surface of the cover via the transparent resin layer.

The wave-transmitting cover of the invention is fitted to the opening of an exterior member of a vehicle in any known method, as so mentioned hereinabove. Fitted to the opening, the display face of the outer surface of the cover is seen through the outer surface of the exterior member of a vehicle. In the cover, therefore, the transparent resin layer may be formed of an ordinary transparent resin of high weather resistance such as polycarbonate.

For the base layer, usable are any of transparent resins or black resins such as AES, ASA. Not limited to these, any known resin material may be used for it. In case where the decorative layer that will be described herein under is formed of a transparent resin, the base layer is preferably formed of a black resin. In this case, the area of the decorative layer not having a lustered piece and a print layer formed thereon may be seen black since the base layer is black, and the decorative layer may be seen to have a contrasty three-dimensional design. In addition, since the base layer is formed of a black resin, the wave radar that is disposed on the back side of the wave-transmitting cover may be hardly seen through the exterior member such as a front grille of a vehicle, and it is effective for improving the overall design of a vehicle to which the cover is fitted.

In case where the transparent resin layer is formed of polycarbonate, the base layer is preferably formed of AES. This is because, since AES and polycarbonate have almost the same dielectric constant, wave transmission through them may be better.

The decorative layer is laminated in the space between the transparent resin layer and the base layer, and it displays a design thereof on the outer surface of the cover via the transparent resin layer. Specifically, since the transparent resin layer that forms the outermost surface of the wave-transmitting cover is formed of a transparent resin, the design of the decorative layer that underlies the transparent resin layer is seen on the outer surface of the cover via the transparent resin layer. The decorative layer may be formed by previously molding a resin material into a film followed by laminating the film on the transparent resin layer or the base layer being molded, along with a lustered piece thereon. The lustered piece will be described hereinunder. Alternatively, it may be formed by laminating a resin material on the transparent resin layer or the base layer in any known method of injection molding or the like while the lustered piece is laminated on the layer.

In the wave-transmitting cover of the invention, the decorative layer contains a lustered piece having a deposition design face formed through vapor deposition of a metal material of which the crystals grow in the deposition direction to give a predetermined design. Various known materials may be used for the metal material of which the crystals grow in the deposition direction. Preferably, the metal material is selected from indium, tin and gold in view of its deposition mode of such that the metal crystals growing in the deposition direction are well spaced from each other. Specifically, since the metal is deposited while its crystals growing in the deposition direction are well spaced from each other, wave transmission through the space between the deposited metal crystals is better. Accordingly, when the metal of the type is deposited, it attains good metallic gloss and good wave transmission. The metal material of which the crystals grow in the deposition direction will be hereinunder abbreviated to its simple term "metal material".

The lustered piece may be formed by depositing a metal material on the surface of a resin plate of a known resin material of, for example, transparent or color resin. The deposited metal material gives a metallic gloss. The decorative layer may have the lustered piece alone or may have the lustered piece and a resin layer that supports the lustered piece. Depending on the desired design thereof, the resin layer that supports the lustered piece may be formed as a film and various patterns may be printed on the film layer. In case where various patterns are printed on the film layer, the repetitive steps of masking and deposition, or those of masking, painting and drying may be omitted, and the production process may be significantly simplified. In any case, it is desirable that the lustered piece is formed smaller than the transparent resin layer and the base layer. Forming the small lustered piece enables the reduction in the amount of the metal material for deposition and therefore the reduction in the production costs. This is because of the following reasons: Ordinary metal deposition is effected in a vacuum chamber in which a metal material for vapor deposition and an object to be coated with it are put. In this case, the amount of the metal material for one vapor deposition in one and the same vacuum chamber is all the time a predetermined one irrespective of the number and the size of the objects to be coated in the chamber. This means that, when a larger number of objects are put in a vacuum chamber so as to be coated through metal vapor deposition therein, then the amount of the metal material needed for coating one object is smaller and therefore the production costs are lower. Accordingly, when the lustered piece is made smaller than the transparent resin layer and the base layer in the invention, then the number of the lustered pieces that may be in one vacuum chamber in one metal vapor deposition treatment therein may be increased and, as a result, the amount of the metal material needed for coating one lustered piece in the case may be reduced and the production costs may be therefore reduced. Of the metal materials mentioned above, gold and indium are extremely expensive. Reducing the amount of such expensive metal material needed in the invention leads to significant reduction in the production costs.

An adhesive layer may be provided on at least one surface of the lustered piece. Providing an adhesive layer on at least one surface of the lustered piece enables better bonding of the lustered piece to the film layer or to the transparent resin layer or the base layer in the molding step that will be mentioned hereinunder, therefore leading to more accurate lamination and molding in the step.

In case where the lustered piece is formed of a transparent resin, a black layer may be provided in the space between the lustered piece and the base layer. In this case, the area of the lustered piece not coated with a metal material may be seen black owing to the presence of the black layer below it, and the deposition design face of the lustered piece may be seen to have a three-dimensional design with a good contrast between metallic gloss and black. When the decorative layer comprises the lustered piece and a film layer, the black layer is disposed in the space between the film layer with the lustered piece thereon and the base layer.

In the wave-transmitting cover of the invention, the decorative layer contains the lustered piece and the lustered piece makes the cover have a metallic gloss. In this, only the lustered piece is formed through vapor deposition of a metal material, and the amount of the metal material necessary for vapor deposition to form one lustered piece may be reduced and this leads to the reduction in the production costs. Further, when the film layer is printed to form a print pattern thereon, the production process may be significantly simplified.

In the wave-transmitting cover of the invention, both surfaces of the decorative layer may be covered with a first cover film layer and a second cover film layer. In this, since both surfaces of the decorative layer is covered with a first cover film layer and a second cover film layer, the shape and the design of the decorative layer may be protected with these first and second cover film layers.

Specifically, the decorative layer has a predetermined design formed through vapor deposition or printing on a substrate or film of a resin material. Accordingly, when a thermoplastic resin or the like that plasticizes at a relatively low temperature is used as the resin material for the decorative layer, the film or substrate formed of it may be thermally deformed when the layer is heated in the process of molding the wave-transmitting cover. If the film or substrate is thermally deformed, then the design formed thereon through vapor deposition or printing may also be deformed along with the resin and, as a result, the actually-formed design of the wave-transmitting cover produced could not be the same as the intended design thereof. However, when the decorative layer is covered with a first cover film layer and a second cover film layer, it may be protected by these cover film layers and is therefore hardly deformed even under heat. Thus covered, therefore, the decorative layer of the type may further improve the design of the wave-transmitting cover that comprises it, irrespective of the type of the resin to form the decorative layer. At least any of the first and second cover film layers that is on the side of the transparent resin layer is preferably formed of a transparent resin, and the design of the decorative layer may be well displayed outside through the wave-transmitting cover.

The method for producing the wave-transmitting cover as described the above comprises a film-forming step, a shaping step, a first molding step and a second molding step.

The film-forming step is a step of forming a film that has a print face of a predetermined design and has a deposition design face formed through vapor deposition of a metal material. The film may be formed of any ordinary resin material such as PMMA, PET, polyamide. The printing may be effected in any ordinary manner of gravure printing or the like. The metal vapor deposition may also be effected in any ordinary manner of vacuum evaporation or the like. Any of printing or metal vapor deposition on the film may be effected earlier than the other. Prior to vapor deposition, it is desirable that the printed area is masked in an additional step. The print face and the deposition design face may be on the same side of the film. However, when the film is formed of a transparent resin, they may be on the opposite sides of the film.

The shaping step is a step of shaping the film into a predetermined shape. In this step, the film formed in the previous film-forming step and having a deposition design face and a print face is shaped into a desired shape. Thus shaped, the film may have a prismatic structure with printed and metal-deposited patterns thereon and its design is therefore three-dimensionally seen. Shaping the film may be effected in any ordinary manner of, for example, vacuum forming or pressure forming. Thus processed in the shaping step, the film gives a decorative layer having a deposition design face and a print face.

The first molding step comprises disposing the shaped film in a mold and molding one of a transparent resin layer or a base layer thereon to give a first molded part. In this first molding step, one of a transparent resin layer or a base layer is molded on one face of the shaped film to give a first molded part that has a film-existing face on which the film is exposed out. In this first molding step, the recesses of the prismatic structure of the film that has been shaped in the shaping step are filled with a transparent resin layer or a base layer on one surface thereof, and therefore, the transparent resin layer or the base layer formed herein shall have a planar surface profile.

The second molding step is a step of forming the other of the transparent resin layer or the base layer on the film-existing face of the first molded part. Accordingly, the second molding step is for forming the base layer when the transparent resin layer is formed in the first molding step, or for forming the transparent resin layer when the base layer is formed in the first molding step.

Also in this second molding step, the recesses on the other side of the prismatic structure of the shaped film are filled with the transparent resin layer or the base layer, thereby giving a planar surface profile. Accordingly, the wave-transmitting cover thus produced in the first and second molding steps may readily have an almost predetermined thickness. After the first and second molding steps, the process gives the wave-transmitting cover of the invention in which a film, or that is, a decorative layer is laminated between the transparent resin layer and the base layer.

According to the above method for producing the wave-transmitting cover, a transparent resin layer is formed on one surface of the film layer and a base layer is on the other surface thereof. According to it, therefore, the thickness of the wave-transmitting cover that comprises the film layer, the transparent resin layer and the base layer may be readily a predetermined one. In addition, since a part of the design of the cover is formed through printing in the method, some repetitive steps of masking and metal vapor deposition, or those of masking, painting and drying may be omitted, and the production process may be simplified and the production costs may be thereby reduced.

Another method for producing the wave-transmitting cover of the above differs from the former described method of the invention in point of the first and second molding steps therein.

In this method, the first molding step comprises disposing the shaped film in a mold, forming a transparent resin layer or a base layer on the printed surface of the film and removing the film to thereby form a first molded part that has the print face and the deposition design face transferred thereon from the film. In this, the second molding step is for forming the other of the transparent resin layer or the base layer on the transfer face of the first molded part.

In the method for producing the wave-transmitting cover of the invention, the film is so constructed that it has a print face and a deposition design face on one side thereof and it is peelable. After a transparent resin layer or a base layer is formed on the side of the film that has a print face and a deposition design face, the film is removed whereby the print face and the deposition design face are transferred onto the transparent resin layer or the base layer to form a transfer face thereon. Accordingly, the film to be used in the invention is preferably so constructed that its layer with a print face and a deposition design face is bonded to the film body, for example, with an adhesive layer.

According to the above method for producing the wave-transmitting cover of the invention, a transparent resin layer is formed on one side with a print face and a deposition design face formed thereon, and a base layer is on the other side thereof. According to it, therefore, the thickness of the wave-transmitting cover may be readily a predetermined one. In addition, since a part of the design of the cover is formed through printing in the method, some repetitive steps of masking and metal vapor deposition, or those of masking, painting and drying may be omitted, and the process of metal vapor deposition maybe simplified and the production costs maybe thereby reduced. Moreover, since only the print face and the deposition design face of the film are transferred onto the decorative layer, the compatibility of the transfer face-having layer, or that is, the decorative layer with the transparent resin layer and the base layer is bettered and delamination or the like failure in the cover produced according to the method may be more surely prevented.

Furthermore, another method for producing the wave-transmitting cover of the invention is characterized in point of the film-forming step and the first molding step therein.

In the method for producing the wave-transmitting cover of this aspect of the invention, the film-forming step comprises forming a film having a print face of a predetermined design and forming a lustered piece having a deposition design face formed through vapor deposition of a metal material. In this, the first molding step comprises disposing the shaped film with the lustered piece thereon in a mold and molding one of a transparent resin layer or a base layer on it to give a first molded part.

In the above method for producing the wave-transmitting cover of the invention, since the film having a print face of a predetermined design and the lustered piece having a predetermined deposition design face are formed separately, it is desirable that at least one of the film or the lustered piece is formed to have an adhesive layer via which the film is bonded to the lustered piece.

According to the above method for producing the wave-transmitting cover of the invention, a transparent resin layer is formed on one surface of the film and a base layer is on the other surface thereof. According to it, therefore, the thickness of the wave-transmitting cover that comprises the film, the transparent resin layer and the base layer may be readily a predetermined one. In addition, since a part of the design of the cover is formed through printing in the method, some repetitive steps of masking and metal vapor deposition, or those of masking, painting and drying may be omitted, and the production process may be simplified and the production costs may be thereby reduced. Moreover, the lustered piece may be small, and a large number of such small lustered pieces may be produced in one metal vapor deposition process. Accordingly, the amount of the metal material needed for producing one lustered piece may be reduced and the production costs for the cover may be therefore reduced.

Another method for producing the wave-transmitting cover of the invention is further characterized by a shaping and molding step in place of the shaping step and the first molding step.

In the above method for producing the wave-transmitting cover of the invention, the film-forming step is for forming a film that has a deposition design face formed through vapor deposition of a metal material. In this, the shaping and molding step comprises molding a transparent resin layer or abase layer in a mold, forming a design face of a predetermined design on its surface, applying the film to the transparent resin layer or the base layer in the mold with its deposition design face being in contact with the layer, shaping it in that condition into a predetermined shape and removing the film to give a first molded part that has the deposition design face transferred thereon from the film.

Only a deposition design face is formed on the film, while a design face is formed on one of the transparent resin layer or the base layer; and the deposition design face of the film is transferred onto the transparent resin layer or the base layer having the design face thereon. In this method, therefore, at least the deposition design face may be more readily formed in a mode of transferring.

In the above method for producing the wave-transmitting cover of the invention, the design face formed on the transparent resin layer or the base layer constitutes the decorative layer of the cover along with the deposition design face transferred thereonto. In this, the design face may be formed in any method of painting or coating known in the art. In case where the design face is formed on the transparent resin layer, the area of the layer onto which the deposition design face is to be transferred is preferably masked prior to the formation of the design face on the layer, and the deposition design face transferred onto the predetermined area of the layer may be more clearly seen through the cover.

In the method for producing the wave-transmitting cover of the invention, both surfaces of the film and the lustered piece may be covered with a first cover film layer and a second over film layer in the film-forming step. In this embodiment, since the film and the lustered piece may be protected with the first and second cover film layers as so mentioned above, they may improve the design of the wave-transmitting cover that comprises them, irrespective of the type of the resin to form the film and the lustered piece. In this, at least any of the first and second cover film layers that is on the side of the transparent resin layer is preferably formed of a transparent resin also as so mentioned hereinabove, and the design of the decorative layer may be well displayed outside through the wave-transmitting cover. Both surfaces of the film and the lustered piece as referred to herein indicate both faces of the film in some of the aspect of the invention. In the other aspect of the invention, however, they indicate both faces of the film and both faces of the lustered piece, or both faces of the integrated structure of the film and the lustered piece bonded to and integrated with the film.

In the particular embodiment, since both surfaces of the film and the lustered piece are covered with the first cover film layer and the second cover film layer, the film structure that comprises the film (or the film and the lustered piece) and the first and second cover film layers may be thick. In this, therefore, the film structure may be often difficult to shape in the shaping step or in the shaping and molding step. In such a case, the film structure may be shaped in a mode of vacuum forming or pressure forming, in which the film structure or the film, a part of the film structure may be readily shaped into a desired shape. In the shaping step or the shaping and molding step, the cavity between a shaping mold of a pair of split molds having a shaping face and the film to be molded therein is kept in a vacuum condition, and the film is drawn under suction toward the shaping mold (vacuum forming); while a pressure is applied to the film from the side of the other mold toward the shaping mold so that the film may be pressed against the shaping mold (pressure forming). Preferably, vacuum forming is combined with pressure forming in this embodiment to better the compatibility of the film structure to the shaping mold, and the film structure, even though thick, maybe readily shaped into a desired shape. In this embodiment, a minor gap may be provided on a part of the face of the shaping mold that is to give a step profile to the film structure, in the wall direction of the mold. In this case, air that remains in the gap thus provided between the film structure and the shaping mold may move in the gap while the film structure is shaped, and the airtight adhesiveness between the film structure and the shaping part of the mold is bettered, and, in that condition, even thick film structures may be more accurately shaped.

Of the shaping mold, the shaping face on which the film structure is shaped to have a step profile may be formed of a material that has open cellular pores. In this case, air that remains in the space between the film structure and the shaping mold may also move toward the pores, and even thick film structures may be more accurately shaped like in the above. In case where both faces of the film are not covered with any of the first and second cover film layers or where only one face thereof is covered with any of them, the film and the film structure will not be so thick. In such a case, therefore, only any one of vacuum forming or pressure forming may be employed in the shaping step or in the shaping and molding step.

In the method for producing the wave-transmitting cover of the invention, any one of the split molds used in the first molding step or in the shaping and molding step may be used also in the second molding step, and the transparent resin layer and the base layer may be formed in a mode of two-part molding.

Forming the transparent resin layer and the base layer in a mode of two-part molding makes it possible to carry out the second molding step while the transparent resin layer or the base layer having been formed in the first molding step or in the shaping and molding step is still left in the mold. Accordingly, the transparent resin layer or the base layer having been formed in the first molding step or in the shaping and molding step is laminated with the other layer, not once cooled, and the temperature difference between the transparent resin layer and the base layer is reduced. This prevents delamination of the transparent resin layer and the base layer that may be caused by the difference in the expansion coefficient between the two layers. Accordingly, the production loss in the process of producing the wave-transmitting cover may be reduced and the production costs of the cover may be therefore reduced. Further, since it is unnecessary to once take out the transparent resin layer or the base layer having been formed in the first molding step or in the shaping and molding step, this prevents the failure of delamination of the print face and the deposition design face from the layer during processing them, and the production loss that may be caused by the failure may be reduced and the production costs may be thereby further reduced.

(3) Another aspect of the invention is directed to a method for producing a wave-transmitting cover mounted in an opening of a front grille of a vehicle provided with fin portions, wherein a wave radar is disposed on a back side of the cover, comprising the steps of:

a first step of forming a base layer having projections corresponding to the fin portions;

a second step of forming a metal film on the projections so that dummy fin portions are formed; and a third step of potting a surface on which the dummy fin portions are formed with a transparent resin.

According to the invention, by conducting a potting molding with a resin or a transparent resin to the surface on which the decorative layer is formed, it is possible to obtain a wave-transmitting cover with a laminated structure without using numerous kinds of molds.

The above method may further comprise a fourth step of black-painting the whole area except the dummy fin portions in the surface on which the dummy fin portions are formed.

In the first step of this aspect of the invention, the base layer is formed in a shape such that projections corresponding to shapes of the fin portions of the front grille are formed on it. The base layer can be formed by injection molding or other conventional forming methods with conventional materials such as ABS resin and AES resin etc.

In the second step of this aspect of the invention, a decorative layer including a metal film is formed on a surface of each projection on the base layer formed in the first step. By forming the metal film on the surface of the projection, thereby forming a dummy fin portion, the wave-transmitting cover of the invention can be observed as if the cover has surface shapes integral with those of the fin portions of the front grille. The metal film can be formed with well-known metals, alloys by well-known methods such as deposition, printing, and plating or the like. Alternatively, the film may be formed non-metal paint or coating material with metal glow. It is preferable that the metal film has a color identical or similar to the metal color of the fin portions of the front grille. Further, the thickness of the film is preferably to be in constant, a film thickness of 350 $\mu$m or lower. It is further preferable that the metal film is formed by deposition with iridium, and that an etching treatment is conducted after forming the metal film.

In the third step of this aspect of the invention, a transparent resin is disposed by potting molding on the surface on which the decorative layer is formed so as to form the dummy fin portions. By providing resin layers on the decorative layer, a flat surface can be easily obtained on the resin layer. Moreover, a wave-transmitting cover with a uniform thickness can be easily obtained. In such the case, since the thickness in the direction of gravity becomes uniform in the resin layer formed by potting molding, it is necessary to install the base layer in a horizontal position when the potting molding is conducted. In the wave-transmitting cover produced by a production method according to this aspect of the invention, the surface on which the potting molding with the transparent resin has been conducted is disposed on a surface of the front grille, the dummy fin portions as the decorative layer are observed from the front side of the vehicle through the transparent resin. Accordingly, the transparent resin is required not to interfere with the design of the decorative layer. Therefore, it is preferable that the transparent resin has a high transparency. Further, since the transparent resin is disposed in an outermost layer of the wave-transmitting cover in such a manner that the transparent resin is exposed to the outside air, it is preferable that the transparent resin formed with a material having high weather-resistance. Accordingly, as to transparent resins in the production method of this aspect of the invention, polyurethane and unsaturated polyester resins etc. which have high transparency and weather-resistance are preferably used. Alternatively, epoxy resins may be used in the production method of this aspect of the invention.

The transparent resin may be formed by potting molding directly on the base layer. Alternatively, potting molding may be conducted with a potting mold having an opening only one side or having a frame-like shape so as to have a desired potting shape. For using the potting mold, the potting mold is installed so that its opening is located on the upper side, and the base layer is fixed in the potting mold in such a manner that a surface for potting molding is located on the upper side. In this state, the potting molding may be conducted by injecting a transparent resin into the potting mold from its opening. In the case that such the potting mold is used for potting, a preferred molding can be conducted by preventing the transparent resin from flowing to outside of the mold.

Another aspect of the invention is directed to a method for producing a wave-transmitting cover according to another aspect of the invention includes a first step of forming a transparent resin layer having recesses formed in a shape complementary to the fin portions with a transparent resin;

a second step of forming a metal film on the recesses so that dummy fin portions are formed; and a third step of potting a surface on which the dummy fin portions are formed with another resin so as to form a base layer.

In the above aspect of the invention, the transparent resin layer having recesses formed in a shape complementary to the fin portions is formed with the transparent resin. The transparent resin layer that is formed with the transparent resin is disposed on the surface of the front grille in such the wave-transmitting cover. Therefore, the transparent resin for the transparent resin layer is preferably selected from resins that have high weather-resistance and transparency such as polycarbonate and acrylic resins. Such the transparent resin may be formed by conventional molding methods such as injection molding.

In the second step of this aspect of the invention, metal films constituting a decorative layer are formed on surfaces of the recesses of the transparent resin layer. As described above, the wave-transmitting cover of this aspect of the invention is disposed on the front grille so that the transparent resin layer is on the surface of the front grille. Accordingly, the metal films, which are formed on the recesses of the transparent resin layer formed with the transparent resin, are observed from the front side of the vehicle through the transparent resin layer. By providing the decorative layer such as dummy fin portions with the metal films on the recesses of the transparent resin layer, the wave-transmitting cover of this aspect of the invention can be observed as if the cover has surface shapes integral with those of the fin portions of the front grille. The metal film can be formed with well-known metals, or alloys by well-known methods such as deposition, printing, and plating or the like. Alternatively, the film may be formed non-metal paint or coating material with metal glow. It is preferable that the metal film has a color identical or similar to the metal color of the fin portions. Further, the thickness of the film is preferably to be in constant with a film thickness of 350 μm or lower.

In the third step of this aspect of the invention, another resin constituting a base layer is disposed by potting molding on the surface on which the decorative layer is formed so as to form the dummy fin portions. In this aspect of the invention, since the surface on which potting molding is conducted is mounted as a backside of the front grille, it is not necessary using a transparent resin. Well-known polyurethane resin, unsaturated polyester resin, and epoxy resin or the like may serve as material resin. Here, potting molding maybe conducted directly on the base layer similarly to the third step of the former aspect of the invention. Alternatively, a potting molding may be conducted with a potting mold having an opening only one side or having a frame-like shape so as to have a desired potting shape.

According to these aspects of the invention using potting molding, a transparent resin or another resin is formed by potting molding on the surface where the decorative layer is provided so as to form the dummy fin portions. By providing resin layers on the decorative layer by potting molding, the wave-transmitting cover having laminate structure can be fabricated without using various kinds of molds. Generally, percentage of costs necessary for molds in the total manufacturing cost is high. Particularly, in the case of small-lot production, the costs for molds makes considerably high compared with other costs. According to the invention, it is possible to reduce the number of molds. Therefore, the total manufacturing cost can be lowered particularly in the case of small-lot production. In other words, according to the conventional methods, the individual layers for constituting a cover are separately molded by respective molds, before laminating the layers into the cover. On the other hand, in the methods according to the invention, by providing a resin on the transparent resin layer formed in the first step by potting molding, a wave-transmitting cover having a laminate structure cab be obtained. In the invention, as described above, a mold having only an opening or a frame-shape is necessary for potting molding, so that the number of mold cab be reduced.

Moreover, by providing a transparent resin or other resin on the base layer or transparent resin layer by potting molding, a uniform thickness can be easily obtained in the wave-transmitting cover with the laminate structure. It is preferable in invention that the thickness of the cover is uniform in a direction perpendicular to the transmitting path of waves. As the waves pass through the wave-transmitting cover, the transmitting speed of the waves would be varied if the thickness were uneven. In such the case, good radar sensitivity is hardly obtained.

In the conventional molding methods in which individual layers are separately formed by respective molds and are subsequently laminated so as to be integrated, it is very difficult to mold the individual layers with high accuracy and to precisely laminate them. To solve the problem, a modification process for adjusting the thickness of the layers is required. However, according to the invention, a layer of the resin or the transparent resin is provided on the transparent resin layer or base layer respectively by potting molding. Therefore, the laminating process for laminating the individual layers is not necessary. Further, even if a certain error is caused in the thickness of the base layer (or the transparent resin layer), the resin layer is formed on the base layer so as to make up the thickness difference of the base layer. Therefore, the wave-transmitting cover having a uniform thickness can be easily formed.

In a potting molding, it is possible that a thickness difference is caused between a center portion and edges in the molded layer of the resin or the transparent resin. However, the wave-transmitting cover can be used suitably as long as thickness of the cover with respect to the wave transmitting path is uniform. Therefore, the thickness difference caused in the layer molded in the present invention is negligible in its operation.

Further, in the above aspect of the invention, it is preferable that a fourth step of painting black on the whole area except the dummy fin portions in the surface on which the decorative layer is formed. By painting black on the area except the dummy fin portions of the surface of the cover, the cover is observed as if no element exists on the area other than the dummy fin portions on the cover. As a result, the integration effect between the front grille and the wave-transmitting cover can be enhanced. The black painting can be conducted by well-known painting or coating methods with well-known black paints in which carbon black or other pigments are contained.

DETAILED DESCRIPTION OF THE PREFERRED EMBODIMENTS

Embodiments of the invention are described below with reference to the drawings attached hereto.

(Embodiment 1)

Figure 1:
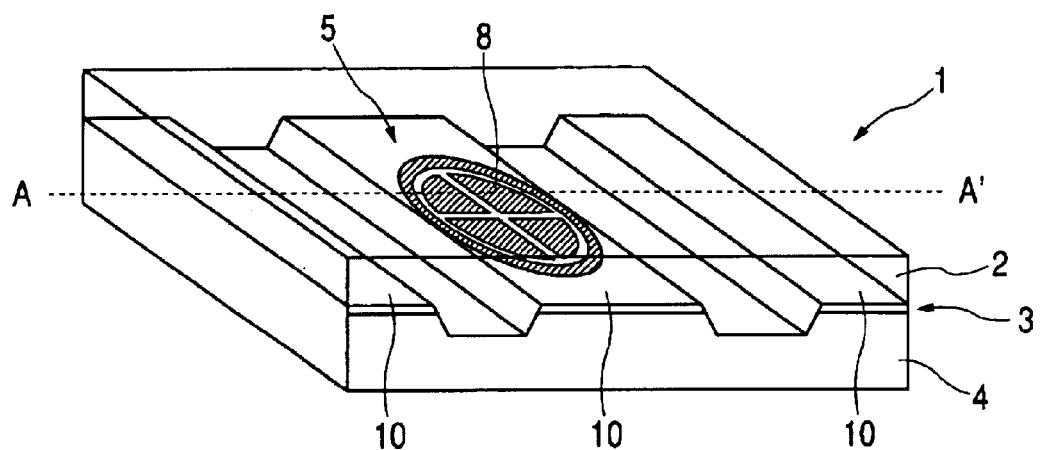
FIG. 1 is a schematic perspective view showing the wave-transmitting cover of Embodiment 1 of the invention.
Figure 2:
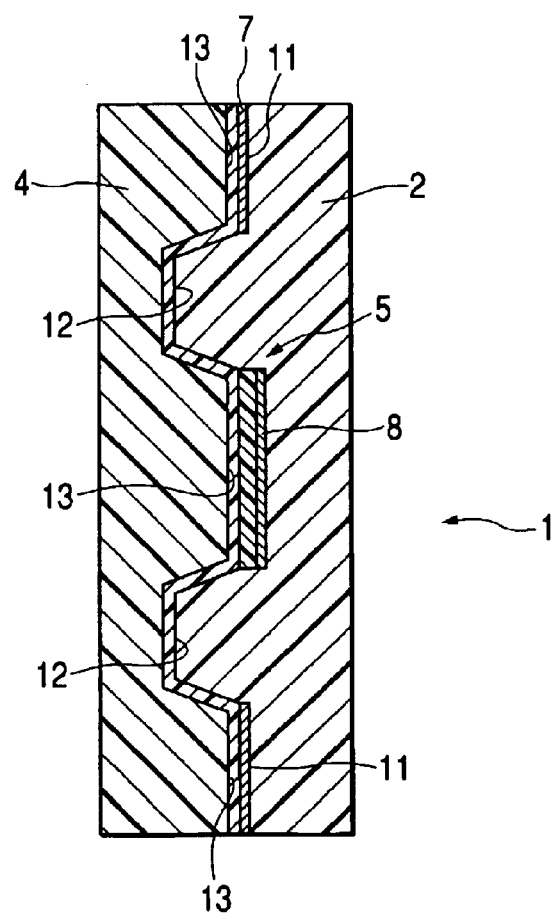
FIG. 2 is the A–A' cross-sectional view of FIG. 1.

In the wave-transmitting cover of Embodiment 1 of the invention, the decorative layer is formed of a film having a lustered piece and a print face formed thereon, in which the lustered piece has a deposition design face formed thereon. FIG. 1 is a schematic perspective view showing the wave-transmitting cover of this Embodiment 1. FIG. 2 shows the A–A' cross-sectional view of FIG. 1.

The wave-transmitting cover 1 of this Embodiment 1 comprises a transparent resin layer 2, a decorative layer 3 that underlies the transparent resin layer 2, and a base layer 4 that further underlies the decorative layer 3.

The decorative layer 3 comprises a small lustered piece 5 and a film 7 on which the lustered piece 5 is formed. The lustered piece 5 is formed of PMMA to be a nearly oval tabular disc, and indium is vapor-deposited on one surface thereof to form thereon a deposition design face 8 of an emblem. The film 7 is formed of PMMA, and a stripe pattern of dummy fin portions 10 is gravure-printed on one surface thereof to form a print face 11 for a fin-like design of a front grille. In addition, the film 7 is shaped along the design of the stripe pattern of dummy fin portions 10, and two recesses 12 and three projections 13 are alternately formed.

A transparent resin layer 2 of polycarbonate is formed on the upper side of the decorative layer 3, or that is, on the upper side of the print face 11 and the deposition design face 8 of the lustered piece 5 formed on the film 7. Spaced from the transparent resin layer 2, a base layer 4 of AES resin is formed below the decorative layer 3, or that is, below the print face 11 and the deposition design face 8 of the lustered piece 5 formed on the film 7. The transparent resin layer 2 and the base layer 4 are filled into the recesses of the film 7 that is formed to have a prismatic structure. Therefore, the wave-transmitting cover 1 of the Embodiment 1 is formed to have a predetermined thickness.

Of the design formed by the decorative layer 3, the part not requiring a metallic gloss may have a print face 11 to be formed in a mode of gravure printing. Therefore, in forming this part, repetitive steps of masking and vapor deposition or those of masking, painting and drying may be omitted, and the production costs may be therefore reduced.

In addition, the design of the part that requires a metallic gloss is formed of the lustered piece 5, and the lustered piece 5 is small. Therefore, when a design is formed on the lustered piece 5 through metal vapor deposition, a large number of lustered pieces 5 may be put in a vacuum chamber, and therefore the amount of indium needed for vapor deposition on one lustered piece 5 may be reduced and the production costs may be further reduced.

(Embodiment 2)

FIG. 3 to FIG. 6 are schematic views showing a method for producing a wave-transmitting cover of this Embodiment 2.

The method for producing the wave-transmitting cover of Embodiment 2 comprises a film-forming step, a shaping step, a first molding step and a second molding step.

Figure 3:
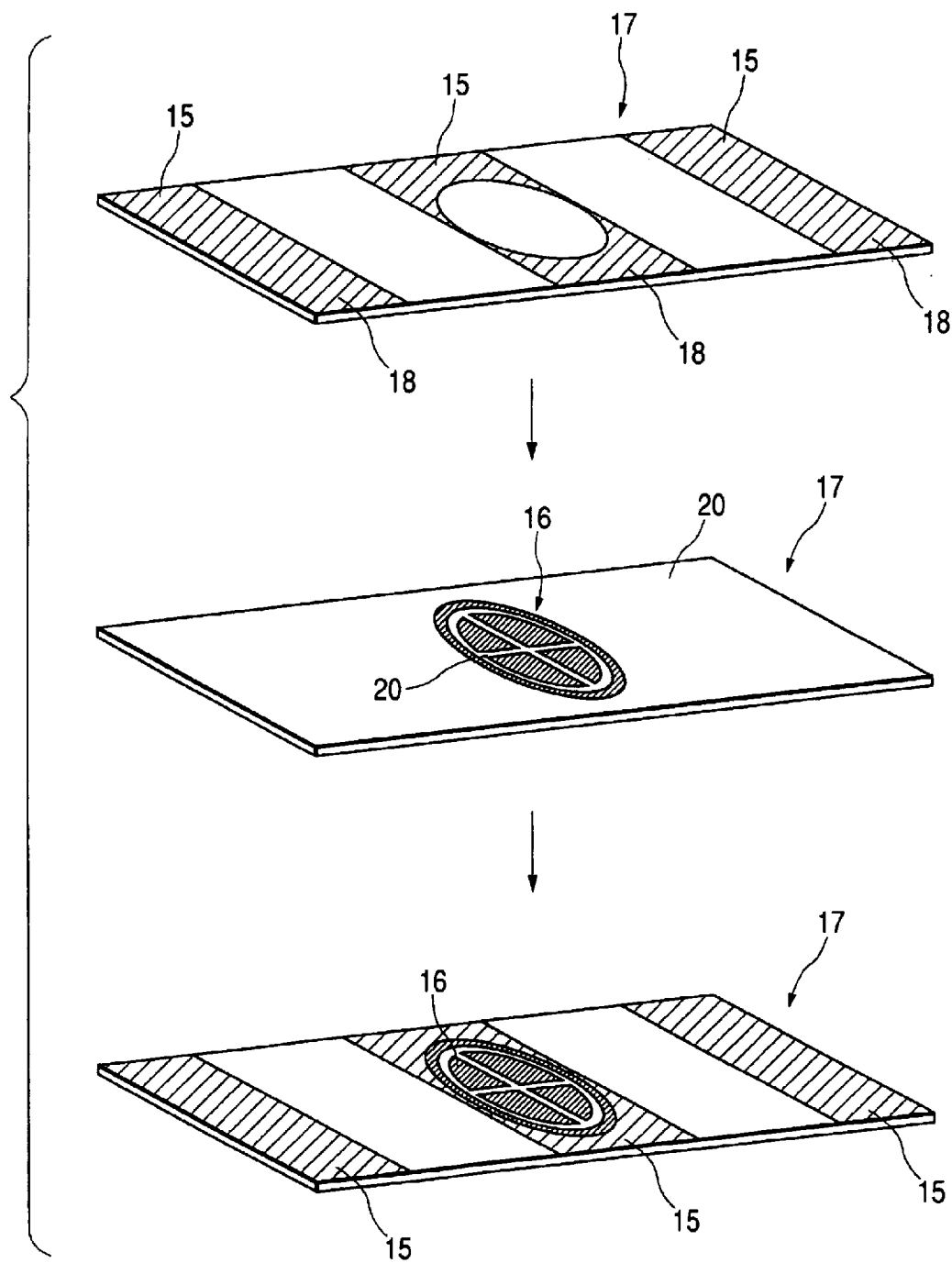
FIG. 3 is a schematic view showing the film-forming step in Embodiment 2 of the invention.

The film-forming step is for forming a film 17 that has a print face 15 of a predetermined design and an indium-deposited design face 16. FIG. 3 is a schematic view showing the film-forming step of Embodiment 2. In this step, a stripe pattern of dummy fin portions 18 is first printed on the PMMA film 17 in a mode of gravure printing to form a print face 15 for a fin-like design of a front grille. Next, the print face 15 of the film 17 and a part of the deposition design face 16 not to undergo indium vapor deposition thereon are masked with a masking material 20. Thus masked, the film 17 is put in a vacuum chamber, in which an emblem design is formed thereon in a mode of vapor deposition. Depending on the desired design, the vapor deposition is effected once or repeated a few times, and the masking with the masking material 20 is accordingly effected once or repeated a few times. In this Embodiment 2, the print face 15 and the deposition design face 16 are formed on the same surface of the film 17 in the film-forming step.

Figure 4:
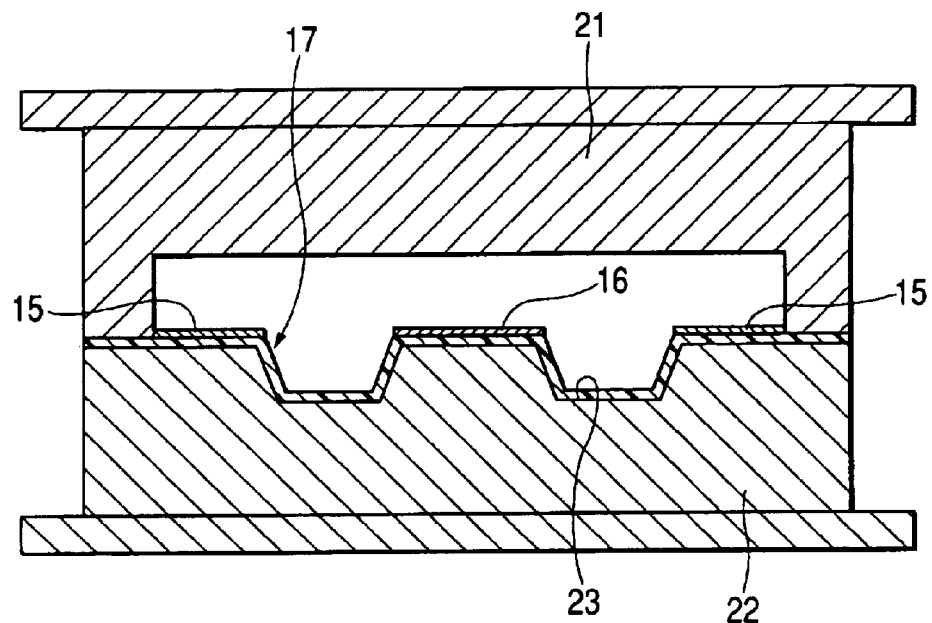
FIG. 4 is a schematic view showing the shaping step in Embodiment 2 of the invention.

The shaping step is for shaping the film 17 into a predetermined shape. FIG. 4 is a schematic view showing the shaping step of Embodiment 2. In this shaping step, a first mold 21 and a second mold 22 are disposed opposite to each other, and the film 17 having the print face 15 and the deposition design face 16 formed thereon in the film-forming step is disposed between them. With that, the film 17 is subjected to vacuum forming toward the direction of the second mold 22 that serves as a shaping mold. Thus shaped, the film 17 has a profile that corresponds to the mold face 23 of the second mold 22. Since the second mold 22 used in this step is so constructed that the part thereof corresponding to the dummy fin portion 18 of the print face 15 of the film 17 is to form a projection, the film 17 shaped by the use of it has a prismatic structure of which the part for the dummy fin portion 18 forms a projection.

Figure 5:
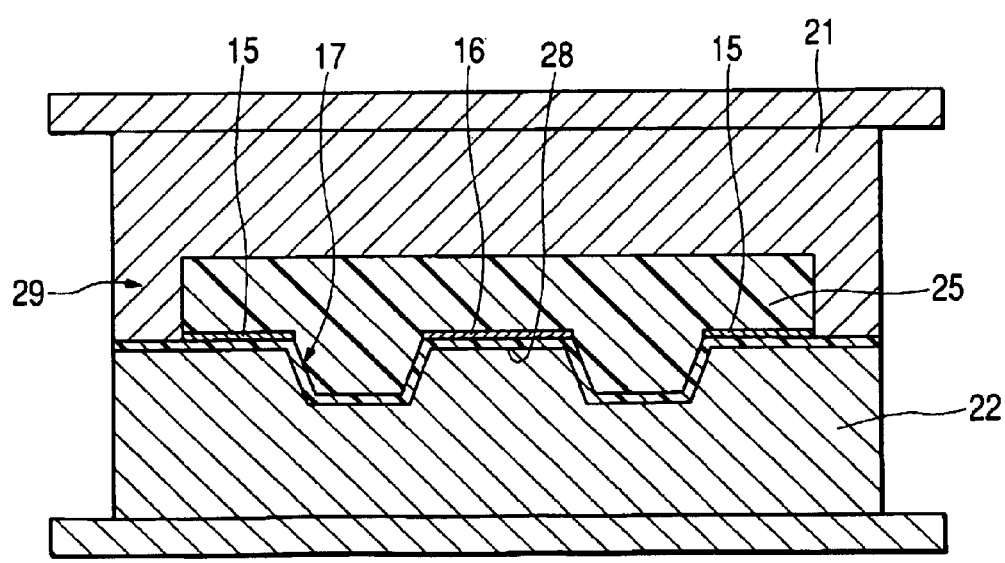
FIG. 5 is a schematic view showing the first molding step in Embodiment 2 of the invention.

The first molding step comprises disposing the shaped film 17 in a mold and molding one of a transparent resin layer or a base layer thereon to give a first molded part. FIG. 5 is a schematic view showing the first molding step of Embodiment 2. In the first molding step of Embodiment 2, a polycarbonate melt is injected into the space between the film 17 having been shaped in the previous shaping step and the first mold 21 to form a transparent resin layer 25, thereby giving a first molded part 29 that comprises the film 17 and the transparent resin layer 25. In this, the film 17 has the print face 15 and the deposition design face 16, and this constitutes the decorative layer 27 of the wave-transmitting cover 26 to be produced herein.

Figure 6:
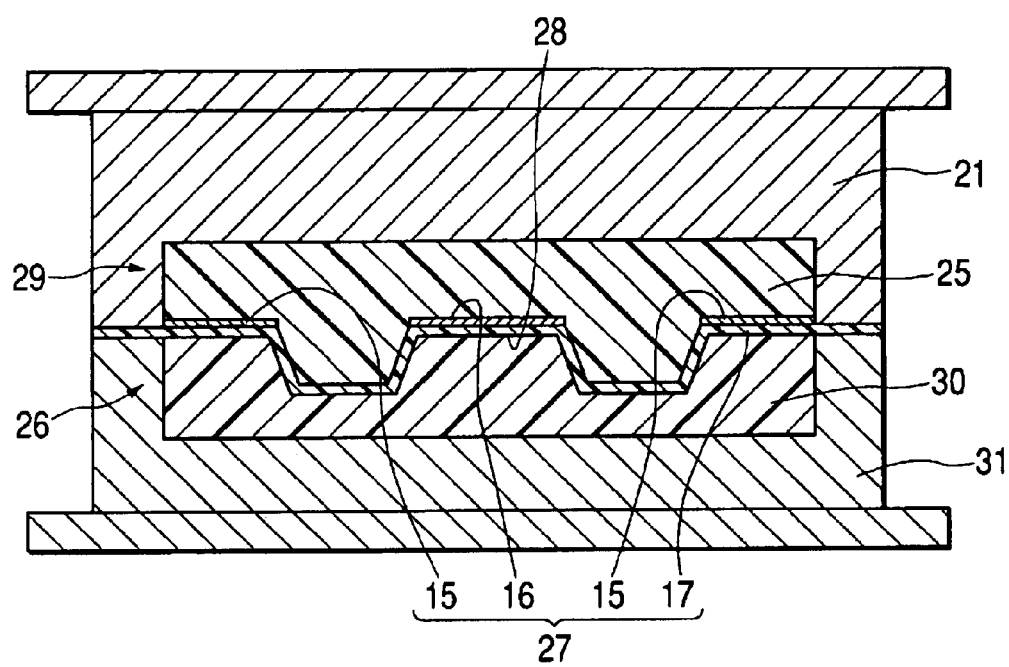
FIG. 6 is a schematic view showing the second molding step in Embodiment 2 of the invention.

The second molding step is for forming the other of the transparent resin layer 25 or the base layer 30 on the film-existing face 28 of the first molded part 29. FIG. 6 is a schematic view showing the second molding step of Embodiment 2. In the second molding step in Embodiment 2, the second mold 22 is opened and this is replaced with a third mold 31 to form a base layer 30. With that, an AES resin melt is injected into the space between the film-existing face 28 of the first molded part 29 and the surface of the third mold 31 to form the base layer 30.

In the production method of this Embodiment 2, the intended wave-transmitting cover 26 is produced through the process of from the film-forming step to the second molding step. In the method of Embodiment 2, the transparent resin layer 25 is formed on one surface of the film 17, and the base layer 30 is on the other surface thereof. In this, therefore, the wave-transmitting cover 26 that comprises the film 17, the transparent resin layer 25 and the base layer 30 may readily have a predetermined thickness. In addition, since a part of the design is formed through metal vapor deposition and the other thereof is through printing, repetitive steps of masking and vapor deposition or those of masking, painting and drying may be omitted, and the production process may be simplified and the production costs may be thereby reduced.

Further, in this Embodiment 2, the first mold 21 used in the first molding step is used also in the second molding step and the transparent resin layer 25 and the base layer 30 are formed in a mode of two-part molding. Therefore, in the wave-transmitting cover 26 produced herein, the adhesiveness between the transparent resin layer 25 and the base layer 30 is good and the two layers do not delaminate.

(Embodiment 3)

Figure 7:
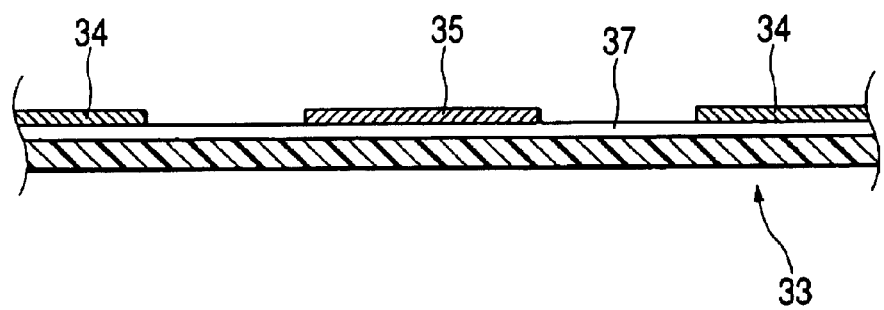
FIG. 7 is a schematic view showing the film formed in the film-forming step in Embodiment 3 of the invention.
Figure 8:
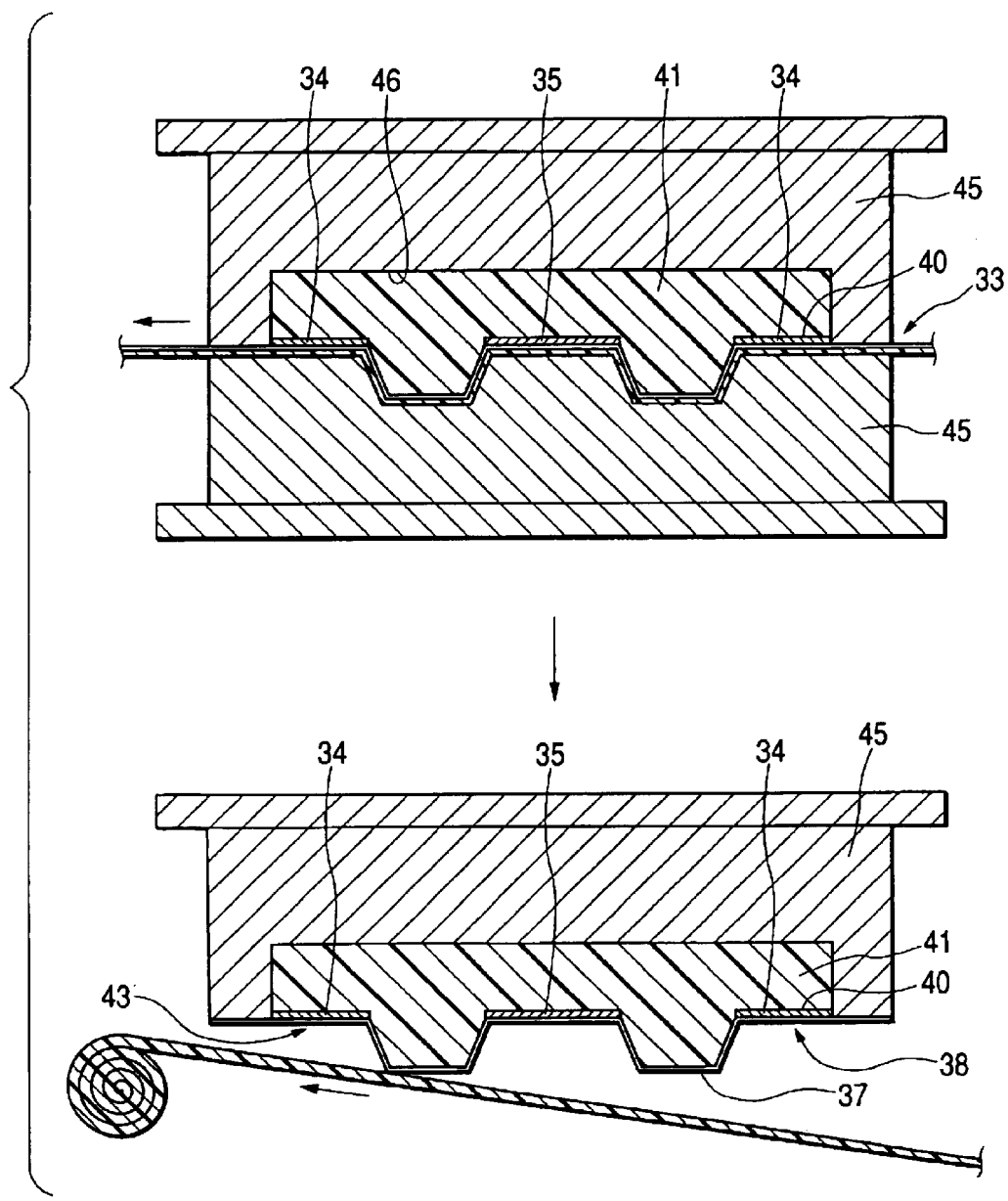
FIG. 8 is a schematic view showing the first molding step in Embodiment 3 of the invention.
Figure 9:
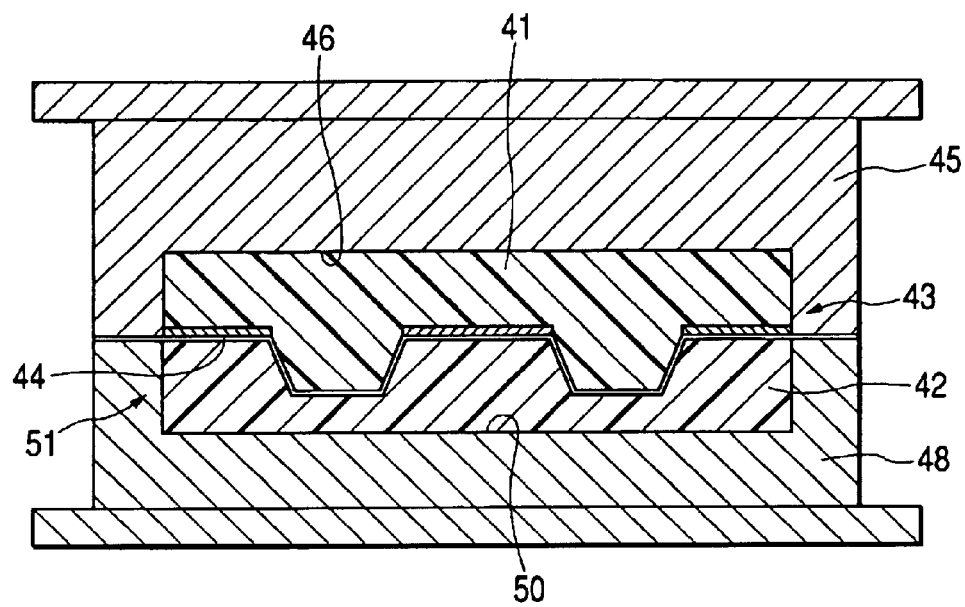
FIG. 9 is a schematic view showing the second molding step in Embodiment 3 of the invention.

FIG. 7 to FIG. 9 are schematic views showing a method for producing a wave-transmitting cover of this Embodiment 3.

In the film-forming step in this Embodiment 3, an adhesive layer 37 is first formed on the film 33 and thereafter a print face 34 and a deposition design face 35 are formed on the adhesive layer 37, as in FIG. 7. The adhesive layer 37 enables the formation of the transfer face 38 in the first molding step that will be mentioned hereinunder. In the method for producing the wave-transmitting cover of Embodiment 3, the shaping step is the same as in Embodiment 2, and the first molding step and the second molding step are described below.

The first molding step comprises disposing the shaped film 33 in a mold, forming a transparent resin layer 41 or a base layer 42 on the printed surface 40 of the film 33 and removing the film 33 to thereby form a first molded part that has a transfer face 38 with the print face 34 and the deposition design face 35 transferred thereon from the film. FIG. 8 is a schematic view showing the first molding step in Embodiment 3. In the first molding step in Embodiment 3, the film 33 with the print face 34 and the deposition design face 35 formed thereon is so disposed that the printed surface 40 thereof is on the side of the first mold 45, and a polycarbonate melt is injected into the space between the printed surface 40 of the film 33 and the mold face 46 of the first mold 45 to form a transparent resin layer 41. Next, the second mold 47 is opened and the film 33 is removed, thereby giving a first molded part 43 that has a transfer face 38 with a part of the adhesive layer 37, and the print face 34 and the deposition design face 35 transferred onto the transparent resin layer 41 thereof.

The second molding step is for forming the other of the transparent resin layer 41 or the base layer 42 on the transfer face 38 of the first molded part 43. FIG. 9 is a schematic view showing the second molding step in Embodiment 3. In the second molding step in Embodiment 3, a third mold 48 to form a base layer 42 is set opposite to the first mold 45, and an AES resin melt is injected into the space between the transfer face 38 of the first molded part 43 that is on the side of the mold face 46 of the first mold 45 and the mold face 50 of the third mold 48, thereby forming the base layer 42.

In the production method of this Embodiment 3, the intended wave-transmitting cover 51 is produced through the process of from the film-forming step to the second molding step. The transparent resin layer 41 is formed on one surface of the decorative layer 44 that has the print face 34 and the deposition design face 35 transferred thereonto, while the base layer 42 is formed on the other surface thereof. Accordingly, the wave-transmitting cover 51 that comprises the decorative layer 44, the transparent resin layer 41 and the base layer 42 may readily have a predetermined thickness. In addition, since a part of the design is formed through metal vapor deposition and the other thereof is through printing, repetitive steps of masking and vapor deposition or those of masking, painting and drying may be omitted, and the production process maybe simplified and the production costs maybe thereby reduced. Further, the first mold 45 used in the first molding step is used also in the second molding step and the transparent resin layer 41 and the base layer 42 are formed in a mode of two-part molding. Therefore, in the wave-transmitting cover 51 produced herein, the adhesiveness between the transparent resin layer 41 and the base layer 42 is good and the two layers do not delaminate.

In the method for producing the wave-transmitting cover 51 of Embodiment 3, only the print face 34 and the deposition design face of the film 33 are transferred. Accordingly, the compatibility of the decorative layer 44 that has the print face 34 and the deposition design face 35 transferred thereonto, with the transparent resin layer 41 and with the base layer 42 is good, and therefore the failure such as delamination of the layers is more surely prevented.

(Embodiment 4)

Figure 10:
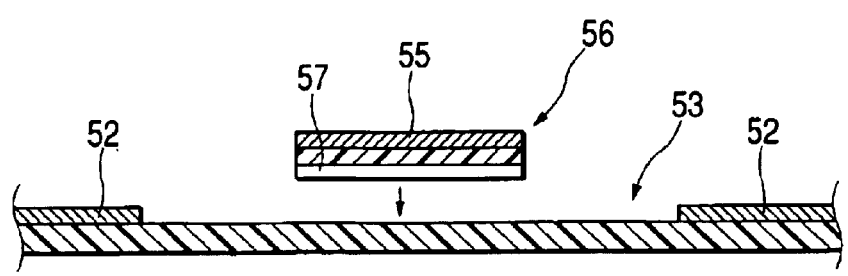
FIG. 10 is a schematic view showing the film-forming step in Embodiment 4 of the invention.
Figure 11:
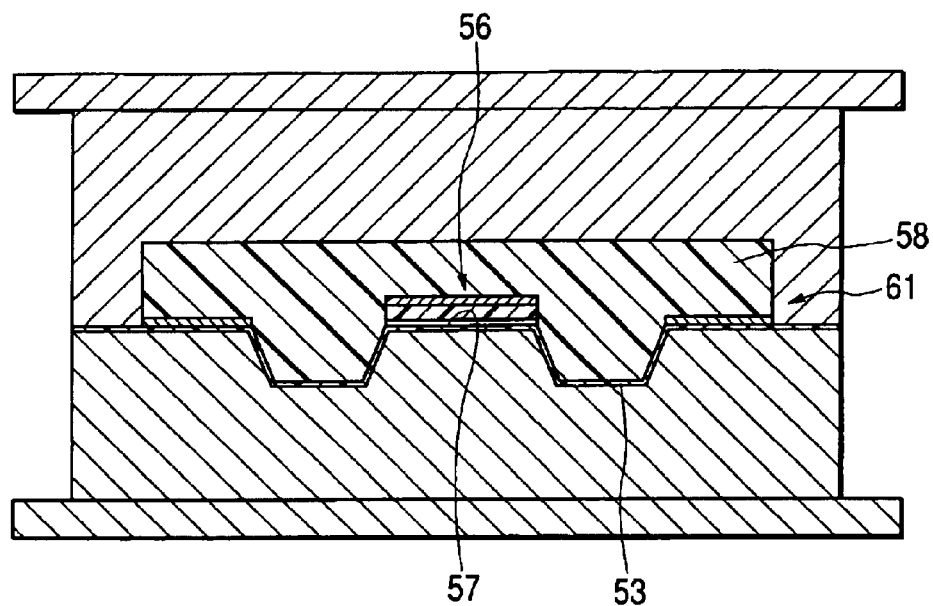
FIG. 11 is a schematic view showing the first molding step in Embodiment 4 of the invention.

FIG. 10 and FIG. 11 are schematic views showing a method for producing a wave-transmitting cover of this Embodiment 4. In Embodiment 4, the shaping step and the second molding step are the same as in Embodiment 2, and the film-forming step and the first molding step are described below.

The film-forming step comprises forming a film 53 having a print face 52 of a predetermined design and forming a lustered piece 56 having an indium-deposited design face 55. In Embodiment 4, only the print face 52 is formed on the film 53, and the deposition design face 55 is formed on the surface of the lustered piece 56 that is prepared separately from the film 53. FIG. 10 is a schematic view showing the film-forming step in Embodiment 4.

In the film-forming step, the lustered piece 56 is formed of PMMA to be a nearly oval tabular disc, and indium is vapor-deposited on one surface thereof to form thereon the deposition design face 55 of an emblem. Like in Embodiment 2, only the print face 52 is formed on the film 53 through gravure-printing. On the side opposite to the side of the deposition design face 55 of the lustered piece 56, formed is an adhesive layer 57, via which the lustered piece 56 is bonded to and integrated with the film 53. Thus formed in the film-forming step, the film 53 with the lustered piece 56 thereon is shaped to have a prismatic structure like in the shaping step in Embodiment 2.

In the first molding step, the shaped film 53 with the lustered piece 56 thereon is disposed inside a mold, in which one of a transparent resin layer 58 or a base layer is molded thereon to give a first molded part 61. FIG. 11 is a schematic view showing the first molding step in Embodiment 4. In the first molding step, the transparent resin layer 58 is formed on the film 53 that has the lustered piece 56 thereon, in the same manner as in Embodiment 2.

According to the method for producing the wave-transmitting cover of Embodiment 4, the transparent resin layer 58 is formed on one surface of the film 53, and a base layer is on the other surface thereof. In this, therefore, the wave-transmitting cover that comprises the film 53, the transparent resin layer 58 and the base layer may readily have a predetermined thickness. In addition, since a part of the design is formed through printing, repetitive steps of masking and vapor deposition or those of masking, painting and drying may be omitted, and the production process may be simplified and the production costs may be thereby reduced.

Further, the lustered piece 56 may be small, and a large number of such small lustered pieces 56 may be produced in one metal vapor deposition process. Accordingly, the amount of indium needed for producing one lustered piece 56 may be reduced and the production costs may be therefore reduced.

(Embodiment 5)

Figure 12:
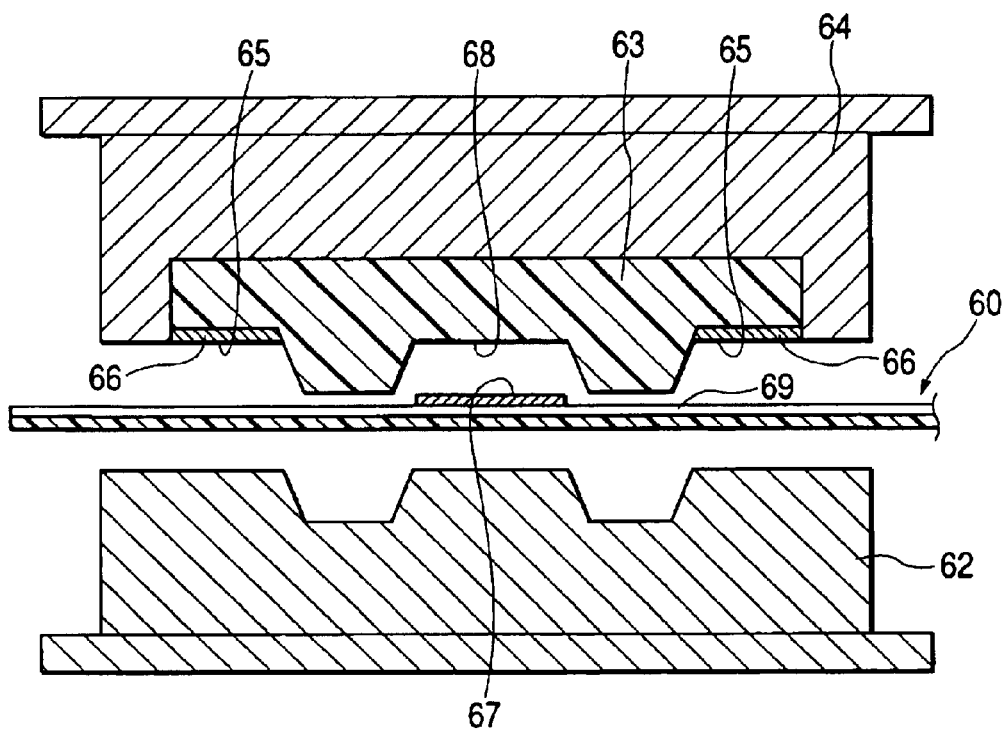
FIG. 12 is a schematic view showing the shaping and molding step in Embodiment 5 of the invention.
Figure 13:
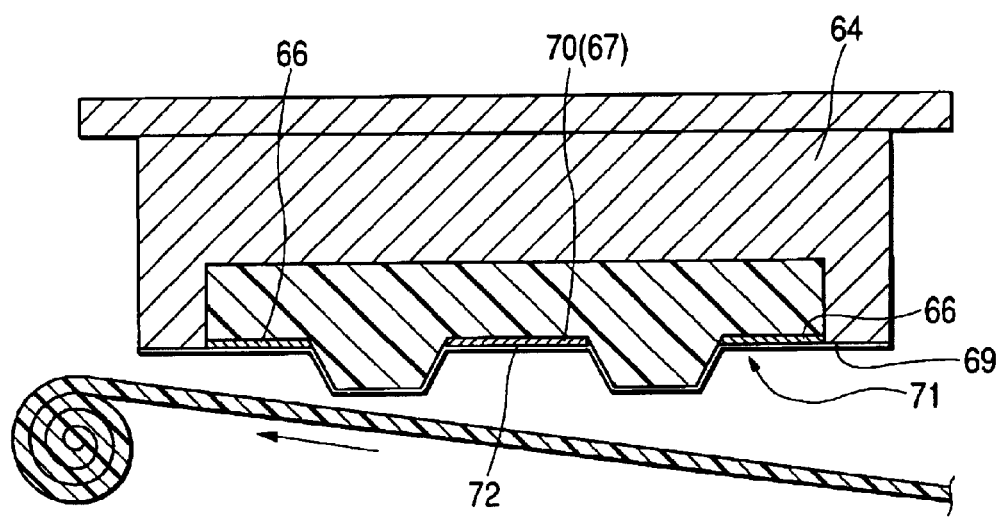
FIG. 13 is a schematic view showing the shaping and molding step in Embodiment 5 of the invention.

FIG. 12 and FIG. 13 are schematic views showing a method for producing a wave-transmitting cover of this Embodiment 5. In Embodiment 5, the second molding step is the same as in Embodiment 3. The film 60 formed in the film-forming step in this Embodiment 5 differs from the film 33 formed in the same step in Embodiment 3 in that the former does not have the print face 34. The shaping and molding step in Embodiment 5 is described below.

First, the first mold 64 is paired with the second mold 62, and a polycarbonate melt is injected into the space between the first mold 64 and the second mold 62 to form a transparent resin layer 63. In this stage, the transparent resin layer 63 is so formed that its surface has a prismatic structure in which the area 65 to be a dummy fin portion is depressed. Next, the area-to-be dummy fin portion 65 of the surface of the transparent resin layer 63 is coated with a coating material to form a design face 66, as in FIG. 12. In this stage, since the area 68 onto which the deposition design face 67 is to be transferred from the film 60 is masked, the area-to-be transferred 68 of the molded transparent resin layer 63 shall be an area in which the design face 66 is not formed. Next, the film 60 is set below the transparent resin layer 63 in such a manner that the deposition design face 67 of the former is adjacent to the design face 66 of the latter, and the film 60 is shaped in a mode of pressure forming in that condition. Thus shaped, the film 60 is peeled, and a part of the adhesive layer 69 and the deposition design face 67 are thus transferred onto the area 68 of the transparent resin layer 63 to give a first molded part 71 that has the transfer face 70 and the design face 66, as in FIG. 13.

According to the method for producing the wave-transmitting cover of Embodiment 5, the transparent resin layer 63 is formed on one surface of the decorative layer 72 that has the transferred, deposition design face 67 and the coated design face 66, and a base layer is on the other surface thereof. In this, therefore, the wave-transmitting cover that comprises the decorative layer 72, the transparent resin layer 63 and the base layer may readily have a predetermined thickness. In addition, since a part of the design is formed through metal vapor deposition while the other thereof is through coating, repetitive steps of masking and vapor deposition or those of masking, painting and drying may be reduced as compared with a case where the design is formed entirely through metal vapor deposition, and the production process may be simplified and the production costs may be thereby reduced. Further, in this, only the deposition design face 67 of the film 60 is transferred. Accordingly, the compatibility of the decorative layer 72 that has the deposition design face 67 transferred thereonto, with the transparent resin layer 63 and with the base layer is good, and therefore the failure such as delamination of the layers is more surely prevented.

(Embodiment 6)

Figure 14:
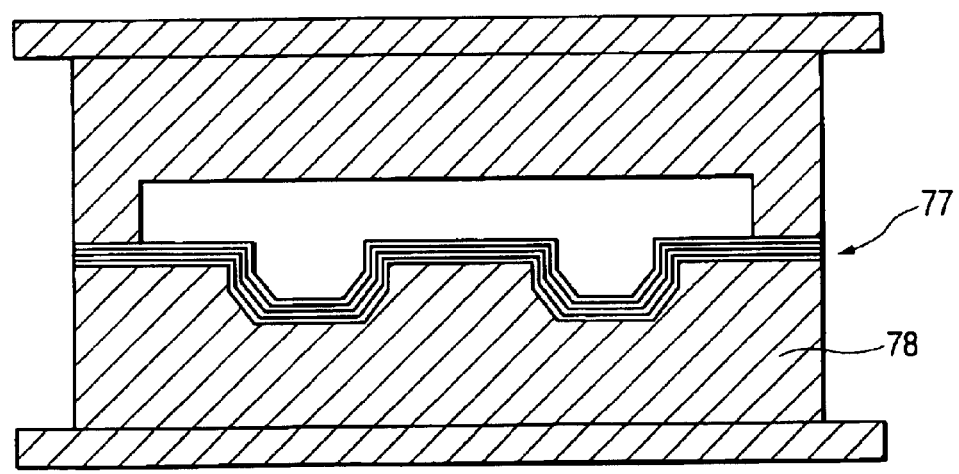
FIG. 14 is a schematic view showing the shaping step in Embodiment 6 of the invention.
Figure 15:
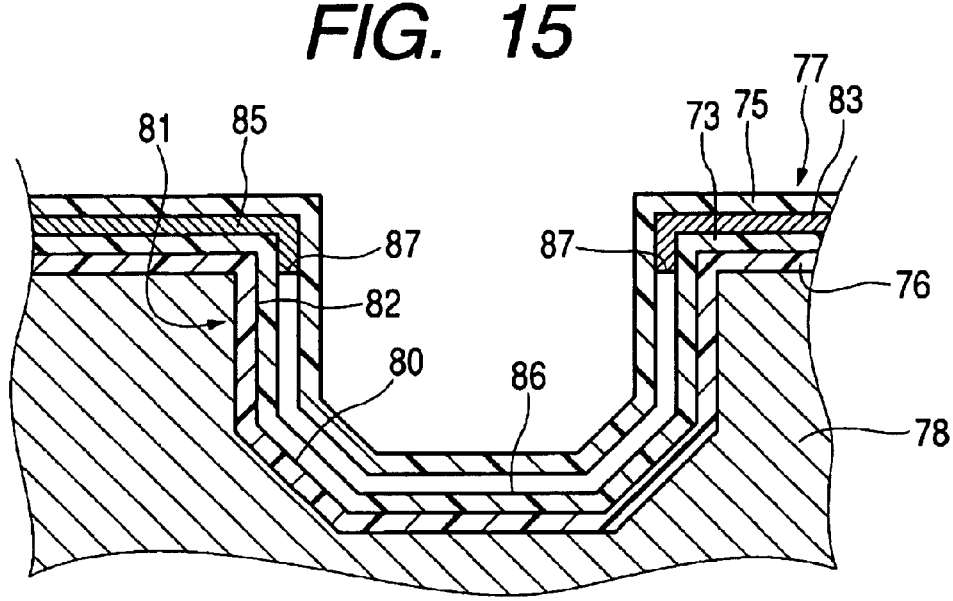
FIG. 15 is an enlarged view showing the essential part of the second mold 78 and the film member 77.

A method of this Embodiment 6 is the same as that of Embodiment 2, except that both surfaces of the film are covered with a first cover film layer and a second cover film layer in the film-forming step and that vacuum forming is combined with pressure forming in the film-shaping step. FIG. 14 and FIG. 15 are schematic views showing the method for producing the wave-transmitting cover of this Embodiment 6.

The film-forming step is for forming a first cover film layer 75 and a second cover film layer 76 of PMMA on both surfaces the film 73 formed in the same manner as in Embodiment 2. The first cover film layer 75 and the second cover film layer 76 are laminated on both surfaces of the film 73. In the film-forming step, formed is a film structure 77 that comprises the film 73, the first cover film layer 75 and the second cover film layer 76.

For shaping the thus-formed film structure 77, used is a second mold 78 formed of alumina having open cellular pores, and this serves as a shaping mold. FIG. 14 is a schematic view showing the shaping step of this Embodiment 6; and FIG. 15 is an enlarged view showing the essential part of the mold 78 and the film structure 77 in FIG. 14.

Since the second mold 78 that serves as a shaping mold has open cellular pores, air that remains in the space between the film structure 77 and the second mold 78 may move toward the pores while the film structure 77 is shaped, and even thick film structures 77 may be more accurately shaped. In addition, in the shaping step, the film structure 77 may be shaped in a mode of vacuum shaping combined with pressure shaping toward the second mold 78, and even thick film structures 77 may be shaped to have any desired shape.

Figure 16:
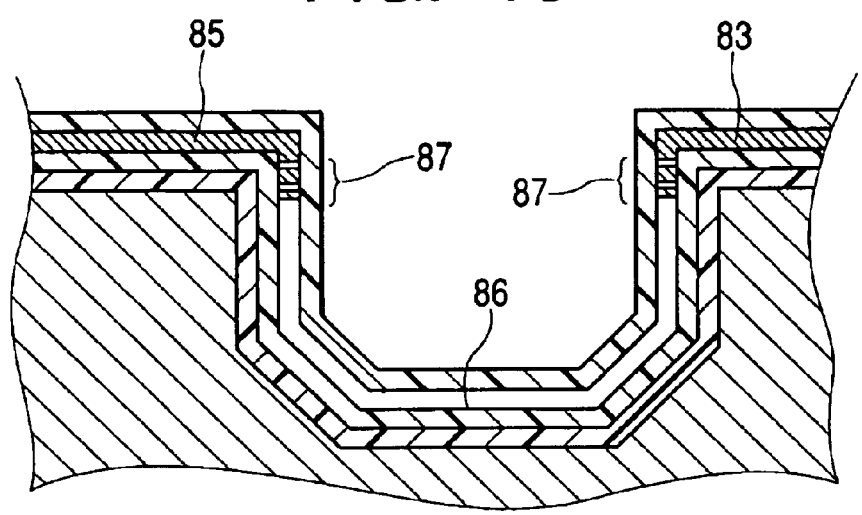
FIG. 16 is an enlarged view showing the essential part of another embodiment of the boundary portion.

Of the mold face 80 of the second mold 78 in this Embodiment 6, the face 81 on which the film structure 77 is shaped to have a step profile is machined to have a parting portion 82 that stands vertically. Of the film structure 77, the boundary portion 87 between the deposition design face 83 or the print face 85 and the colorless face 86 not printed or metal-deposited is disposed on the parting portion 82, and the film structure 77 is shaped in that condition. In the wave-transmitting cover thus produced, the parting portion 82 is hardly seen through its front. Accordingly, the design of the wave-transmitting cover of the type is bettered. In addition, even when the shaping accuracy is relatively low and boundary portions 87 are erroneously shifted from the prismatic structure to be shaped, the boundary portion 87 could be still on the parting portion 82 so far as the erroneous shift of the boundary portion 87 is within the range of the length of the parting portion 82 and, if so, the boundary portion 87 would be also hardly seen through the front of the cover. Accordingly, this embodiment facilitates the production of the wave-transmitting cover, not requiring any high accuracy in shaping the film structure. Not limited to this, the boundary portion 87 between the deposition design face 83 or the print face 85 and the colorless face 86 may be stepwise varied and shaded off, as in FIG. 16. In this embodiment, even when the boundary portion 87 steps out a little from the parting portion 82 and the film structure 77 is shaped in that condition, the erroneous shift of the boundary portion 87 in the shaped film structure is not so much noticeable since the boundary portion 87 itself is shaded off. This embodiment also facilitates the production of the wave-transmitting cover.

The method for producing a wave-transmitting cover of Embodiment 6 is superior to that of Embodiment 1 in that the design of the wave-transmitting cover produced in the former is bettered. Specifically, the first cover film layer 75 and the second cover film layer 76 are formed on both surfaces of the film 73 in Embodiment 6, and the film 73 is therefore protected with the first cover film layer 75 and the second cover film layer 76. Accordingly, even when the film 73 is shaped at a high temperature and is therefore exposed to such a high temperature, the film 73 may be prevented from being deformed and the design of the wave-transmitting cover produced may be bettered. In addition, since the film 73 is shaped in a mode of vacuum forming combined with pressure forming, its shaping may be effected with accuracy even though it is laminated with the first cover film layer 75 and the second cover film layer 76 on both surfaces thereof to be the thick film structure 77. Further, the second mold 78 for the shaping mold has open cellular pores, and it enables accurate shaping of even the thick film structure 77.

(Embodiment 7)

Figure 17:
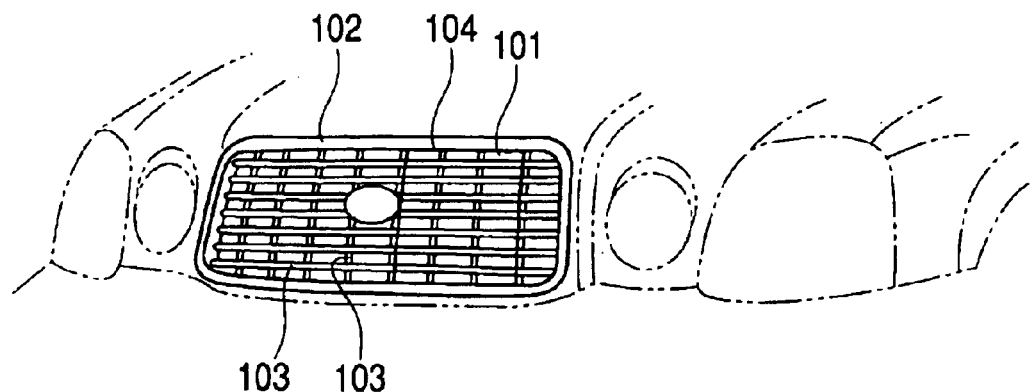
FIG. 17 shows a state that a wave-transmitting cover fabricated by the method according to Embodiment 7 is installed on a front grille of a vehicle.
Figure 18:
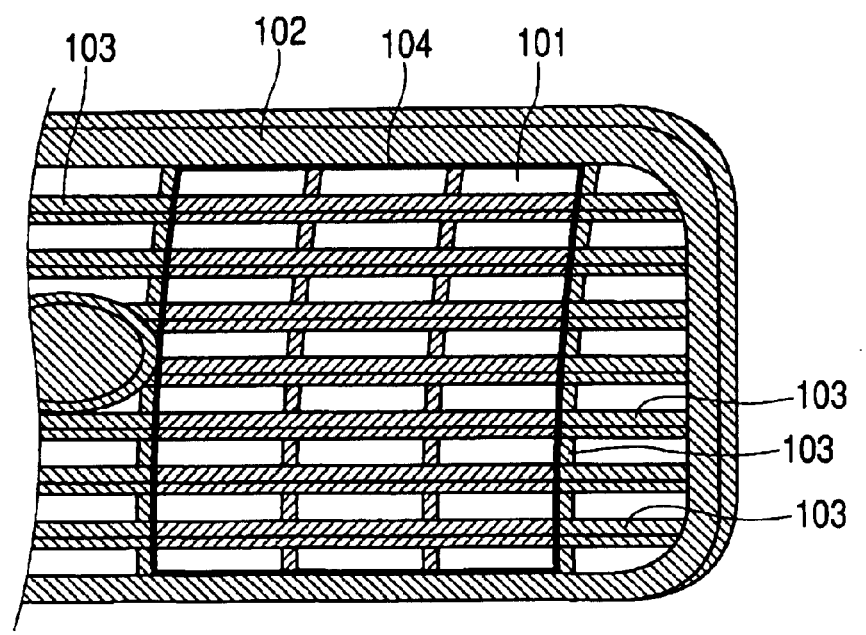
FIG. 18 is an enlarged view of the front grille and the wave-transmitting cover of FIG. 17.
Figure 19:
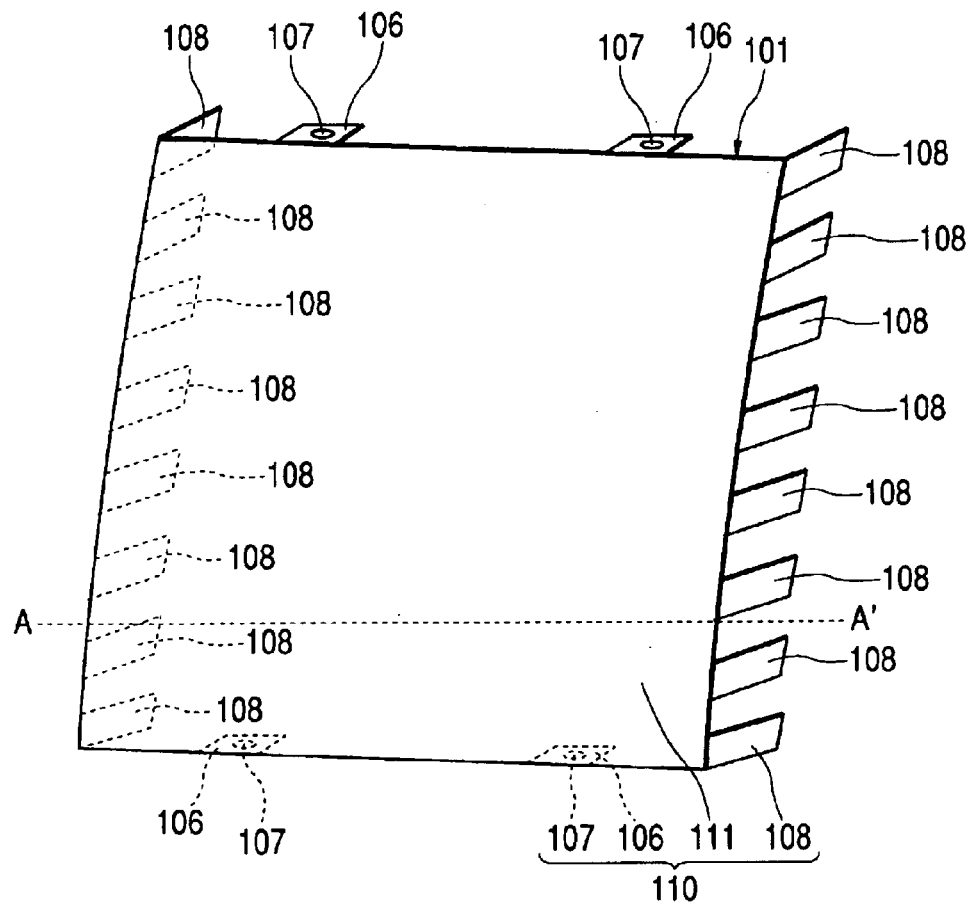
FIG. 19 is a perspective view showing the wave-transmitting cover fabricated by the method according to Embodiment 7.
Figure 20:
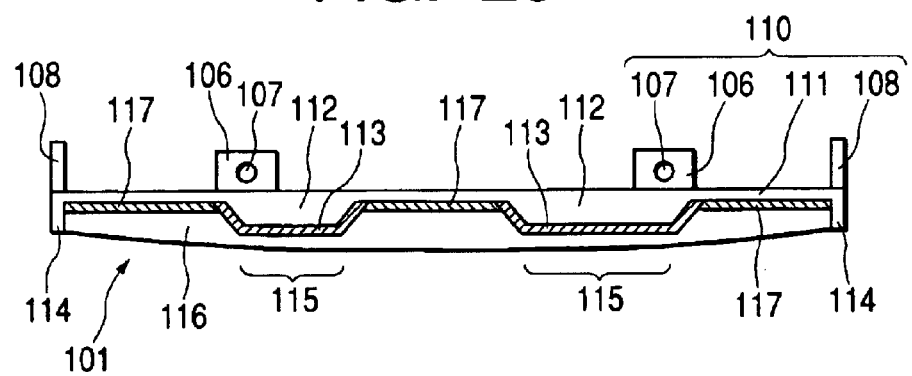
FIG. 20 is an B–B' sectional view of FIG. 19.

Embodiment 7 is directed to a method for producing a wave-transmitting cover according to the first aspect of the invention. FIG. 17 shows a state that a wave-transmitting cover fabricated by the method according to the invention is installed on a front grille of a vehicle, FIG. 18 is an enlarged view of the front grille and the wave-transmitting cover of FIG. 17. Further, FIG. 19 is a perspective view showing the wave-transmitting cover fabricated by the method according to the invention. FIG. 20 is an B–B' sectional view of FIG. 19.

The wave-transmitting cover 101 fabricated by the method according to the invention is installed at a part of the front grille 102 located on a front face of the vehicle. When the wave-transmitting cover 101 is observed from a front side of the vehicle, an impression is given as if the front grille and the wave-transmitting cover 101 form a continuous shape.

In the front grille 102, a window portion 104 is provided by removing fin portions 103 forming a grille shape at predetermined positions. Peak portions (not shown) project from the fin portions 103 located on left and right side edges of the window portion 104 in a direction toward the window portion 104.

Screw tab portions 106 are provided on the upper and lower side edges at four positions in total (two on each of the upper and lower side edges). A screw hole 107 is formed in a center of each screw tab portion 106. Fitting strip portions 108 located at positions complementary to the peaks are formed so as to extend in a direction toward a compartment.

When the wave-transmitting cover 101 is inserted into the window portion 104, the peaks of the front grille 102 and the fitting strip portions 108 of the wave-transmitting cover 101 are engaged and fixed. Further, the screw holes 107 of the wave-transmitting cover 101 are joined to screw holes provided in the front grille 102 by screws.

The method for manufacturing a wave-transmitting cover 1 according to the invention is conducted by the following steps.

<First Step>

In Embodiment 7, the first step is a step of forming a cover base 110 having projections having a shape corresponding to the fin portions 103 of the front grille 102. In Embodiment 7, the first step is conducted by injection molding with a raw material of AES resin. AES resin is supplied to an injection molding apparatus. Then, melted AES resin is injected to a forming mold and cooled for solidification so that the cover base 110 is obtained. The cover base 110 is provided in the first step so as to have a base body 111 of plate member having a thickness of 2.5 mm, four screw tab portions 106 in total extended from upper and lower side edges of the base body 111, namely two screw tab portions 106 on each of the upper and lower side edges of the base body 111, in a direction toward a compartment of the vehicle and sixteen fitting strip portions 108 in total extended in the direction toward the compartment from left and right side edges of the base body 111 namely eight fitting strip portions 108 on each of the left and right side edges of the base body 111 at positions complementary to the peaks of the front grille. Incidentally, the base body 111 correspond to the base layer described in Embodiments 1 through 6. Further, projections 112 having a shape corresponding to the shape of the fin portions 103 of the front grille 102 are formed in a grille-shape on a surface of the base body which forms a front face side when the cover 101 is installed in the front grille 102. A frame portion 114 having a predetermined height is formed on the side edges of the surface of the base body where the projections 112 are formed.

<Second Step>

In Embodiment 7, the second step is a step of forming dummy fin portions 115, which constitutes a decorative layer of the invention, by disposing metal films 113 by vapor-deposition on a surface of the projections 112 formed in the first step. The metal films 113 in Embodiment 7 are formed on the projections 112 of the base body 111 by deposition of iridium as metal material with a film thickness of 350 μm. When the film is deposited, a masking treatment is performed on the surface of the base body 111 except the area on which the projections 112 are formed so that the metal films 113 are formed only on the projections 112. Incidentally, although in this Embodiment 7, the whole of the dummy fin portions 115 are formed with metal layers by vapor-deposition, they may be formed by printing as described in Embodiments 1 through 6 in accordance with the color and design of the front grille 102. Further, a lustered piece having a deposition design face may be formed on the dummy fin portions 115 as described in Embodiments 1 through 6.

<Third Step>

In Embodiment 7, the third step is a step of forming a transparent resin layer 116 by potting molding on the surface of the cover base 110 on which the dummy fin portions 115 are formed. Urethane resin was used for the transparent resin in Embodiment 7. A potting mold (not shown) is provided so that an opening of the potting mold is located on the upper face. The cover base 110 formed in the first and second steps in which the dummy fins 115 are provided is fixed in the potting mold. Incidentally, the cover base 110 is fixed so that the dummy fins 115 are exposed on the upper face. The potting molding is conducted by injecting melted urethane resin into the potting mold, so that the transparent urethane resin layer is formed with a uniform thickness on the surface on which the dummy fin portions 115 are formed. Further, since the frame portion 114 is formed on the outer edges of the cover body 111, the urethane resin is provided only inside of the frame portion 114.

<Fourth Step>

In Embodiment 7, the fourth step is a step of forming a black painting layer 117 by painting black on the area except the dummy fin portions 115 on the surface of the cover base 110 where the dummy fin portions 115 are formed. In Embodiment 7, the painting is performed with a paint containing carbon black. By painting the cover base 110 on which a masking treatment to the dummy fin portions 115 is performed with this paint containing carbon black, the black painting layer 117 are formed on the area except the dummy fin portions 115 on the surface of the cover base 110 where the dummy fin portions 115 are formed.

(Embodiment 8)

Figure 21:
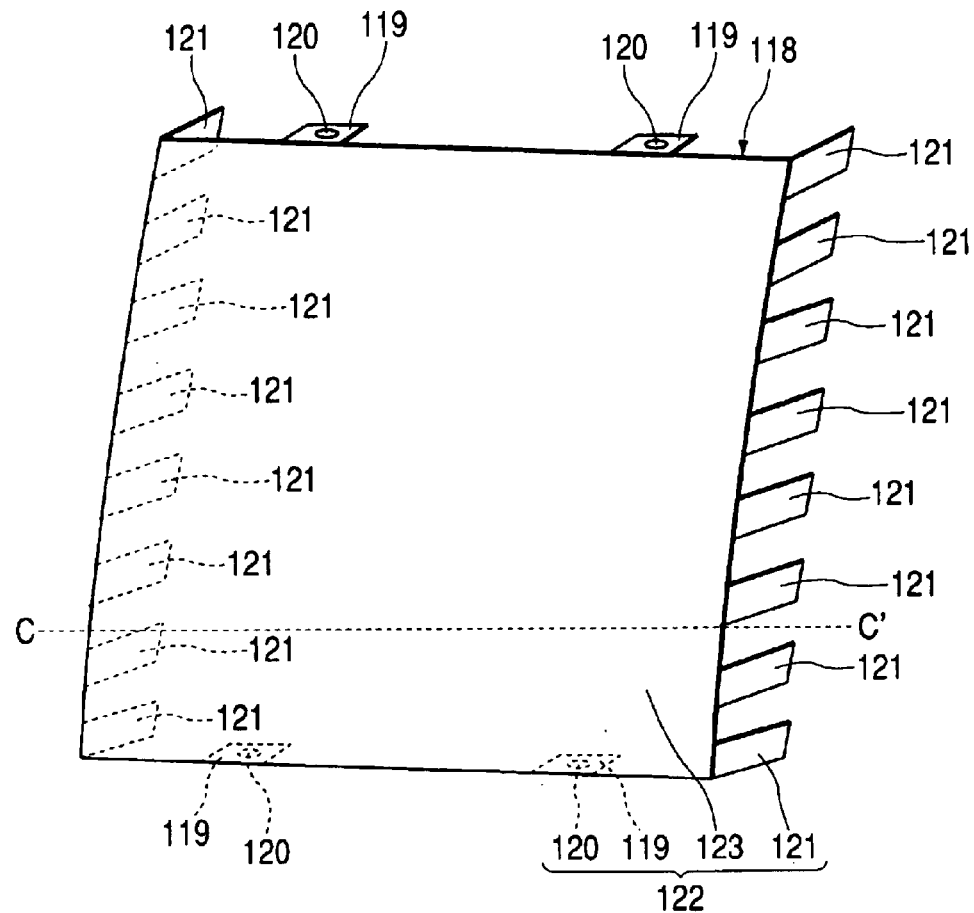
FIG. 21 is a perspective view showing the wave-transmitting cover fabricated by the method according to this aspect of the invention.
Figure 22:
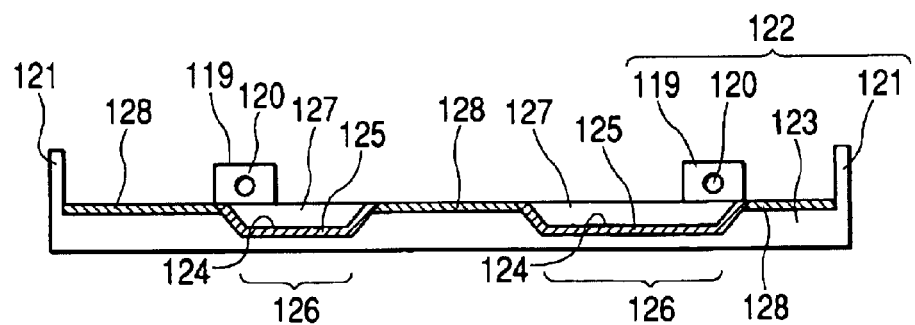
FIG. 22 is a C–C' sectional view of FIG. 21.

Embodiment 8 is directed to a method for producing a wave-transmitting cover according to the second aspect of the invention. FIG. 21 is a perspective view showing the wave-transmitting cover fabricated by the method according to this aspect of the invention. FIG. 22 is a C–C' sectional view of FIG. 21. The wave-transmitting cover 118 fabricated by the method according to Embodiment 8 includes Screw tab portions 119, screw holes 120, and fitting strip portions 121, as described in Embodiment 7.

The method for producing a wave-transmitting cover 118 according to Embodiment 8 is conducted by the following steps.

<First Step>

In Embodiment 8, the first step is a step of forming a cover base 122 having recesses having a shape complementary to the shape of the fin portions of the front grille. In Embodiment 8, the cover base 122 constitutes a transparent resin layer of the invention. The first step is conducted by injection molding with a raw material of polycarbonate resin. Polycarbonate resin is supplied to an injection molding apparatus. Then, polycarbonate melt is injected to a forming mold and cooled for solidification so that the cover base 122 is obtained. The cover base 122 is provided in the first step so as to have a base body 123 of plate member having a thickness of 2.5 mm, four Screw tab portions 119 in total extended from upper and lower side edges of the base body 123, namely two Screw tab portions 119 on each of the upper and lower side edges of the base body 123, in a direction toward a compartment of the vehicle and sixteen fitting strip portions 121 in total extended in the direction toward the compartment from left and right side edges of the base body 123 namely eight fitting strip portions 121 on each of the left and right side edges of the base body 123 at positions complementary to the peaks of the front grille. Further, recesses 124 having a shape complementary to the shape of the fin portions of the front grille are formed in a grille-shape on a surface of the base body which forms a back face side when the cover 1 is installed in the front grille.

<Second Step>

In Embodiment 8, the second step is a step of forming dummy fin portions 126, which constitutes a decorative layer of the invention, by disposing metal films 125 by vapor-disposition on a surface of the recesses 124 formed in the first step. The metal films 125 in Embodiment 8 are formed on the recesses 124 of the base body 123 by deposition of iridium as metal material with a film thickness of 350 μm. When the film is deposited, a masking treatment is performed on the surface of the base body 123 except the area on which the recesses 124 are formed so that the metal films 125 are formed only on the recesses 124. Incidentally, although in this Embodiment 8, the whole of the dummy fin portions 126 are formed with metal layers by vapor-deposition, they may be formed by printing as described in Embodiments 1 through 6 in accordance with the color and design of the front grille 102. Further, a lustered piece having a deposition design face may be formed on the dummy fin portions 126 as described in Embodiments 1 through 6.

<Third Step>

In Embodiment 8, the third step is a step of forming a resin layer 127 constituting a base layer of the invention by potting molding on the surface of the cover base 122 on which the dummy fin portions 126 are formed. The third step of Embodiment 8 is performed in the same manner as the third step of Embodiment 7, except that the potting molding is conducted in the recesses 124 by using Polyurethane resin as a forming resin.

<Fourth Step>

In Embodiment 8, the fourth step is a step of forming a black painting layer 128 by painting black on the area except the dummy fin portions 126 on the surface of the cover base 122 where the dummy fin portions 126 are formed. The fourth step of Embodiment 8 is performed in the same manner as the fourth step of Embodiment 7.

As described hereinabove, the wave-transmitting cover of the invention is so constructed that its decorative cover contains a lustered piece having a deposition design face formed through vapor deposition of a metal material of which the crystals grow in the deposition direction. Therefore, only a predetermined part of the desired design of the cover that must have a metallic gloss may be formed of the lustered piece, or that is, it is unnecessary to apply the metal material of which the crystals grow in the deposition direction to the entire surface of the decorative layer. Accordingly, the amount of the metal material for vapor deposition, of which crystals grow in the deposition direction, maybe reduced, and the production costs may be therefore reduced.

According to a method for producing the wave-transmitting cover of the invention, the desired design is composed of a print face and a deposition design face. In the method, therefore, the part of the design not requiring a metallic gloss may be formed by printing. Accordingly, the production process may be simplified and the production costs may be thereby reduced.

According to a method for producing the wave-transmitting cover of the invention, only the print face and the deposition design face of the film are transferred. Therefore, the advantages of the method are that the compatibility of the decorative layer that has the print face and the deposition design face transferred thereon, with the transparent resin layer and the base layer is bettered and delamination or the like failure in the cover produced according to the method may be more surely prevented.

According to a method for producing the wave-transmitting cover of the invention, a part of the design not requiring a metallic gloss may be formed by printing, and the production process may be simplified and the production costs may be thereby reduced. In addition, the part of the design that requires a metallic gloss is formed of the lustered piece prepared separately from the film. Accordingly, it is unnecessary to apply indium entirely to the intended design, and the amount of indium needed for vapor deposition may be reduced and the production costs may be further reduced.

According to a method for producing the wave-transmitting cover of the invention, a part of the design is formed through metal vapor deposition while the other part thereof is formed by printing or coating. Therefore, as compared with a case where the design is entirely formed through metal vapor deposition, the production process may be simplified and the production costs may be thereby reduced.

According to the invention, by conducting a potting molding to the surface on which the dummy fin portions are formed with a resin or a transparent resin, it is possible to obtain a wave-transmitting cover with a laminated structure without using numerous kinds of molds.

According to the invention, by providing a transparent resin or other resin on the cover base by potting molding, a uniform thickness can be easily obtained in the wave-transmitting cover with the laminate structure According to the invention, by painting black on the area except the dummy fin portions of the surface of the cover, the cover is observed as if no element exists on the area other than the dummy fin portions on the cover. As a result, the integration effect between the front grille and the wave-transmitting cover can be enhanced.

As described above, by the methods of the invention, a wave transmitting cover can be molded with a smaller number of operations and molds. Further, the wave transmitting cover with a uniform thickness can be easily obtained.

What is claimed is:

1. A wave-transmitting cover mounted in an opening of an exterior member of a vehicle, wherein a wave radar is disposed on a back side of the cover, comprising:
    a transparent resin layer exposed on an outer surface of the cover;
    a base layer spaced from the transparent resin layer; and
    a decorative layer laminated in a space between the transparent resin layer and the base layer to display a design thereof on the outer surface of the cover via the transparent resin layer,
    wherein at least a part of the decorative layer is formed through vapor deposition of a metal material of which crystals grow in a deposition direction, thereby obtaining a predetermined design.

2. The wave-transmitting cover as claimed in claim 1, wherein the decorative layer includes a lustered piece having a deposited design face formed through vapor deposition of the metal material.

3. The wave-transmitting cover as claimed in claim 1, wherein the metal material of which the crystals grow in the deposition direction is selected from indium, tin and gold.

4. The wave-transmitting cover as claimed in claim 1, wherein both sides of the decorative layer is covered with a first cover film layer located on a transparent resin side and a second cover film layer located opposite to the transparent resin side, and
    at least the first cover film is formed of a transparent resin.

5. A method for producing a wave-transmitting cover mounted in an opening of an exterior member of a vehicle, wherein a wave radar is disposed on a back side of the cover, comprising:
    a film-forming step of forming a film that has a print face of a predetermined design and a deposition design face formed through vapor deposition of a metal material of which crystals grow in a deposition direction;
    a shaping step of shaping the film into a predetermined shape;
    a first molding step of disposing the shaped film in a mold and molding one of a transparent resin layer or a base layer thereon to thereby form a first molded part, and
    a second molding step of forming the other of the transparent resin layer or the base layer on a surface of the first molded part where the film is provided.

6. The method for producing a wave-transmitting cover as claimed in claim 5, wherein the film is shaped in a mode of vacuum forming or pressure forming in the shaping step.

7. The method for producing a wave-transmitting cover as claimed in claim 5, wherein any one of the split molds used in the first molding step or in the shaping and molding step is used also in the second molding step and
    the transparent resin layer and the base layer are formed in a mode of two-part molding.

8. The method for producing a wave-transmitting cover as claimed in claim 5, wherein the metal material of which the crystals grow in the deposition direction is selected from indium, tin and gold.

9. A method for producing a wave-transmitting cover mounted in an opening of an exterior member of a vehicle, wherein a wave radar is disposed on a back side of the cover, comprising:
    a film-forming step of forming a film that has a print face of a predetermined design and a deposition design face formed through vapor deposition of a metal material of which crystals grow in a deposition direction;
    a shaping step of shaping the film into a predetermined shape;
    a first molding step of forming a first molded part by disposing the shaped film in a mold, forming a transparent resin layer or a base layer on the print face of the film, and removing the film so as to transfer the print face and the deposition design face on a transferred face of the first molded part; and
    a second molding step of forming the other of the transparent resin layer or the base layer on the transferred face of the first molded part.

10. The method for producing a wave-transmitting cover as claimed in claim 9, wherein the film is shaped in a mode of vacuum forming or pressure forming in the shaping step.

11. The method for producing a wave-transmitting cover as claimed in claim 9, wherein any one of the split molds used in the first molding step or in the shaping and molding step is used also in the second molding step and
    the transparent resin layer and the base layer are formed in a mode of two-part molding.

12. The method for producing a wave-transmitting cover as claimed in claim 9, wherein the metal material of which the crystals grow in the deposition direction is selected from indium, tin and gold.

13. A method for producing a wave-transmitting cover mounted in an opening of an exterior member of a vehicle, wherein a wave radar is disposed on a back side of the cover, comprising:

a film-forming step of forming a film having a print face of a predetermined design and forming a lustered piece having a deposition design face formed through vapor deposition of a metal material of which crystals grow in a deposition direction;

a shaping step of shaping the film into a predetermined shape;

a first molding step of disposing the shaped film with the lustered piece thereon in a mold and molding one of a transparent resin layer or a base layer on the shaped film to thereby form a first molded part; and a second molding step of forming the other of the transparent resin layer or the base layer on a surface on which the film is disposed.

14. The method for producing a wave-transmitting cover as claimed in claim 13, wherein both of opposite surfaces of the film and the lustered piece are covered with a first cover film layer located on a transparent resin layer side and a second cover film layer located opposite to the transparent resin layer side in the film-forming step, and at least the first cover film layer is formed of a transparent resin.

15. The method for producing a wave-transmitting cover as claimed in claim 13, wherein the film is shaped in a mode of vacuum forming or pressure forming in the shaping step.

16. The method for producing a wave-transmitting cover as claimed in claim 13, wherein any one of the split molds used in the first molding step or in the shaping and molding step is used also in the second molding step and the transparent resin layer and the base layer are formed in a mode of two-part molding.

17. The method for producing a wave-transmitting cover as claimed in claim 13, wherein the metal material of which the crystals grow in the deposition direction is selected from indium, tin and gold.

18. A method for producing a wave-transmitting cover mounted in an opening of an exterior member of a vehicle, wherein a wave radar is disposed on a back side of the cover, comprising:

a film-forming step of forming a film that has a deposition design face formed through vapor deposition of a metal material of which crystals grow in a deposition direction;

a shaping and molding step of molding a transparent resin layer or a base layer in a mold, forming a deposition design face of a predetermined design on a surface of the transparent resin layer or the base layer, disposing the deposition design face of the film facing to the transparent resin layer or the base layer in the mold so as to shape a surface of the transparent resin layer or the base layer to a predetermined shape and removing the film to thereby form a first molded part that has the deposition design face transferred thereon from the film; and a second molding step of forming the other of the transparent resin layer or the base layer on the transfer face of the first molded part.

19. The method for producing a wave-transmitting cover as claimed in claim 18, wherein the film is shaped in a mode of vacuum forming or pressure forming in the shaping and molding step.

20. The method for producing a wave-transmitting cover as claimed in claim 18, wherein any one of the split molds used in the first molding step or in the shaping and molding step is used also in the second molding step and the transparent resin layer and the base layer are formed in a mode of two-part molding.

21. The method for producing a wave-transmitting cover as claimed in claim 18, wherein the metal material of which the crystals grow in the deposition direction is selected from indium, tin and gold.

22. A method for producing a wave-transmitting cover mounted in an opening of a front grille of a vehicle provided with fin portions, wherein a wave radar is disposed on a back side of the cover, comprising the steps of:

a first step of forming a base layer having projections formed in a shape corresponding to the fin portions;

a second step of forming a decorative layer on the projections so that dummy fin portions are formed; and a third step of potting a surface on which the decorative layer is formed with a transparent resin.

23. The method for producing a wave-transmitting cover according to claim 22, wherein the decorative layer is provided with a metal film formed by vapor deposition.

24. The method for producing a wave-transmitting cover according to claim 22, further comprising a fourth step of black-painting the whole area except the dummy fin portions in the surface on which the decorative layer is formed.

25. A method for producing a wave-transmitting cover mounted in an opening of a front grille of a vehicle provided with fin portions, wherein a wave radar is disposed on a back side of the cover, comprising the steps of:

a first step of forming a transparent layer having recesses formed in a shape complementary to the fin portions with a transparent resin;

a second step of forming a decorative layer on the recesses so that dummy fin portions are formed; and a third step of potting a surface on which the decorative layer is formed with another resin.

26. The method for producing a wave-transmitting cover according to claim 25, wherein the decorative layer is provided with a metal film formed by vapor deposition.

27. The method for producing a wave-transmitting cover according to claim 25, further comprising a fourth step of black-painting the whole area except the dummy fin portions in the surface on which the decorative layer is formed.

* * * * *